(12) United States Patent
Sakakibara et al.

(10) Patent No.: US 12,711,644 B2
(45) Date of Patent: Aug. 18, 2026

(54) DISTANCE MEASURING APPARATUS AND METHOD

(71) Applicant: Hitachi, Ltd., Tokyo (JP)

(72) Inventors: Rei Sakakibara, Tokyo (JP); Ryota Kawamata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 18/699,177

(22) PCT Filed: Aug. 4, 2022

(86) PCT No.: PCT/JP2022/029928

§ 371 (c)(1),
(2) Date: Apr. 5, 2024

(87) PCT Pub. No.: WO2023/135842

PCT Pub. Date: Jul. 20, 2023

(65) Prior Publication Data

US 2025/0238947 A1 Jul. 24, 2025

(30) Foreign Application Priority Data

Jan. 17, 2022 (JP) ................................ 2022-004784

(51) Int. Cl.

| | |
|---|---|
| ***G06T 7/00*** | (2017.01) |
| ***G01C 3/08*** | (2006.01) |
| ***G06T 7/593*** | (2017.01) |

(52) U.S. Cl.

CPC .............. *G06T 7/593* (2017.01); *G01C 3/085* (2013.01); *G06T 2207/10012* (2013.01)

(58) Field of Classification Search

CPC . G06T 7/593; G06T 2207/10012; G06T 1/00; G01C 3/085; H04N 13/00

See application file for complete search history.

(56) References Cited

U.S. PATENT DOCUMENTS

| | | | |
|---|---|---|---|
| 6,816,187 | B1 | 11/2004 | Iwai et al. |
| 6,963,661 | B1 | 11/2005 | Hattori et al. |

(Continued)

FOREIGN PATENT DOCUMENTS

| | | | |
|---|---|---|---|
| JP | 11-248447 | A | 9/1999 |
| JP | 2000-350239 | A | 12/2000 |

(Continued)

OTHER PUBLICATIONS

International Search Report (PCT/ISA/210) issued in PCT Application No. PCT/JP2022/029928 dated Sep. 20, 2022 with English translation (7 pages).

(Continued)

*Primary Examiner* — Philip P. Dang
(74) *Attorney, Agent, or Firm* — Crowell & Moring LLP

(57) ABSTRACT

Provided is a technique capable of reducing a difference in the number of effective pixels between a plurality of images and enhancing performance, accuracy, and the like of distance measurement regarding stereo photographing and distance measurement. The distance measuring apparatus includes an imaging device and a processing device. The processing device includes: a characteristic matching image generating unit that inputs two or more images including a first image obtained by photographing the subject from a first viewpoint and a second image obtained by photographing the subject from a second viewpoint among the images, and generates two or more images as characteristic matching images in which a characteristic of the first image and a characteristic of the second image are matched; and a distance measuring unit that calculates a distance to the subject by calculating a parallax based on the two or more images as the characteristic matching images. The characteristic matching image generating unit generates the characteristic matching images by performing a projecting 800

(Continued)

on a pixel of interest 701 in at least one of the first image and the second image to a corresponding pixel position 702 in the other image.

13 Claims, 22 Drawing Sheets

(56) References Cited

U.S. PATENT DOCUMENTS 8,401,224 B2 * 3/2013 Rhoads .............. H04N 1/32309 382/162
8,824,779 B1 * 9/2014 Smyth ....................... G06T 7/73 382/117
9,019,341 B2 * 4/2015 Kweon ..................... G06T 1/00 348/308
9,064,331 B2 * 6/2015 Yamashita ................ G06T 5/50
9,240,049 B2 * 1/2016 Ciurea ...................... G06T 7/85
9,619,886 B2 * 4/2017 Sawada ................... G06T 7/557
10,102,610 B2 * 10/2018 Forutanpour ............. G06T 3/12
10,922,583 B2 * 2/2021 Kaehler ............. G02B 27/0172
11,002,538 B2 * 5/2021 Nobayashi ............. G01C 3/085
11,290,703 B2 * 3/2022 Shimano ................ G03B 35/08
11,295,475 B2 * 4/2022 Kalra ........................ G06T 7/75
11,328,380 B2 * 5/2022 Pinter ..................... G06T 7/586
11,430,146 B2 * 8/2022 Yan ...................... G06N 3/0464
11,677,921 B2 * 6/2023 Aggarwal .............. G03B 35/08 348/47
11,743,583 B2 * 8/2023 Nishimura ........... H04N 13/239 348/222.1
11,810,311 B2 * 11/2023 Yan ...................... G06N 3/0464
12,126,790 B2 * 10/2024 Makinen .............. H04N 13/317
12,217,444 B2 * 2/2025 Hughes ................ H04N 13/243
12,247,822 B2 * 3/2025 Yamamoto ............. G06T 7/593
12,333,752 B2 * 6/2025 Tsubaki ............... H04N 13/296
12,437,431 B2 * 10/2025 Zhu ........................... G06T 7/55
2002/0085001 A1 * 7/2002 Taylor ....................... G06T 1/00 715/838
2004/0056950 A1 3/2004 Takeda
2006/0268103 A1 11/2006 Kweon et al.
2013/0294683 A1 * 11/2013 Yamashita ............. G06T 15/00 382/154
2021/0006771 A1 1/2021 Yamazaki et al.
2021/0192778 A1 * 6/2021 Heidemann ............ G01B 11/26
2022/0244726 A1 * 8/2022 Shigeta .................. H04N 7/185
2024/0292027 A1 * 8/2024 Mate .................... H04N 19/597

FOREIGN PATENT DOCUMENTS

| | | | |
|---|---|---|---|
| JP | 2001-76128 | A | 3/2001 |
| JP | 2004-117078 | A | 4/2004 |
| JP | 2006-113001 | A | 4/2006 |
| JP | 4388530 | B2 | 12/2009 |
| JP | 2021-12075 | A | 2/2021 |
| JP | 2021-196544 | A | 12/2021 |

OTHER PUBLICATIONS

Japanese-language Written Opinion (PCT/ISA/237) issued in PCT Application No. PCT/JP2022/029928 dated Sep. 20, 2022 with English translation (8 pages).

* cited by examiner

FIG. 3A
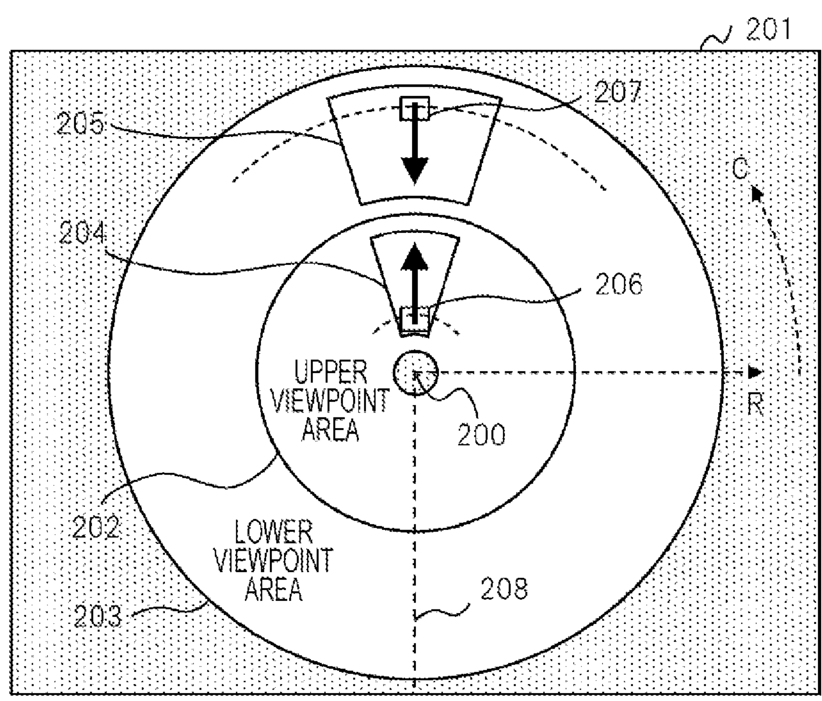
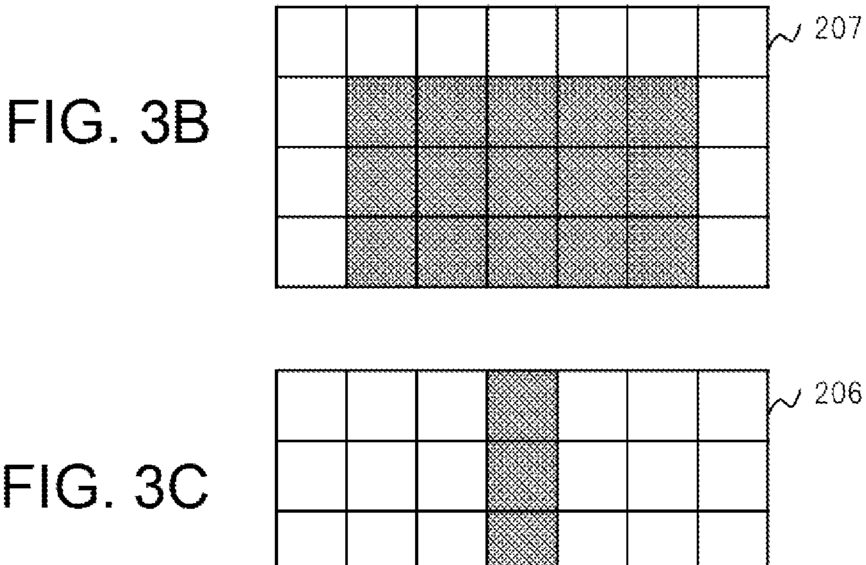
FIG. 3B
FIG. 3C

<COMPARATIVE EXAMPLE: IMAGE PROCESSING>

<COMPARATIVE EXAMPLE 1: INTERPOLATION>

DISTANCE FROM CENTER
NUMBER OF PIXELS (N) IN CIRCUMFERENTIAL DIRECTION
C(X)
R (Y)
r3
r2
r1
NH
NM
NL
302
301
512
511
502
501
IMAGE PROCESSING (BEFORE INVERSION)

NUMBER OF EFFECTIVE PIXELS (E)
NUMBER OF PIXELS (N)
EH
EM
EL
514
513
504
503
IMAGE PROCESSING (AFTER INVERSION)

<COMPARATIVE EXAMPLE 2: DOWNSAMPLING>

DISTANCE FROM CENTER
R (Y)
r3
r2
r1
NUMBER OF PIXELS (N) IN CIRCUMFERENTIAL DIRECTION
C(X)
NH
NM
NL
602
601
612
611
302
301
IMAGE PROCESSING (AFTER INVERSION)

NUMBER OF EFFECTIVE PIXELS (E)
NUMBER OF PIXELS (N)
EL
NL
604
603
IMAGE PROCESSING (AFTER STRETCHING)

614
613

IMAGE HEIGHT CHARACTERISTICS

UPPER SIDE $r' = f(\theta)$

LOWER SIDE $r = g(\theta)$

<CHARACTERISTIC MATCHING PROCESSING>

<PROJECTION+PANORAMIC IMAGE GENERATION>

DISTANCE FROM CENTER
R (Y)
r3
r2
r1
NL
NM
NL
NUMBER OF PIXELS (N) IN CIRCUMFERENTIAL DIRECTION
C(X)
1112
1002
901
1001
1111
301
IMAGE PROCESSING (PANORAMIC IMAGE GENERATION by INTERPOLATION) (AFTER INVERSION)

NUMBER OF EFFECTIVE PIXELS (E)
NUMBER OF PIXELS (N)
EM
NM
EL
NL
EM
NM
EL
NL
1114
1004
1113
1003

FIRST IMAGE OF UPPER CAMERA
SECOND IMAGE OF LOWER CAMERA
1410
1407
1405
C
R
1403
1401
1408
1406
1404
1402
PORTION 1407
PORTION 1408

FIG. 17A
FIG. 17B
FIRST IMAGE OF UPPER CAMERA
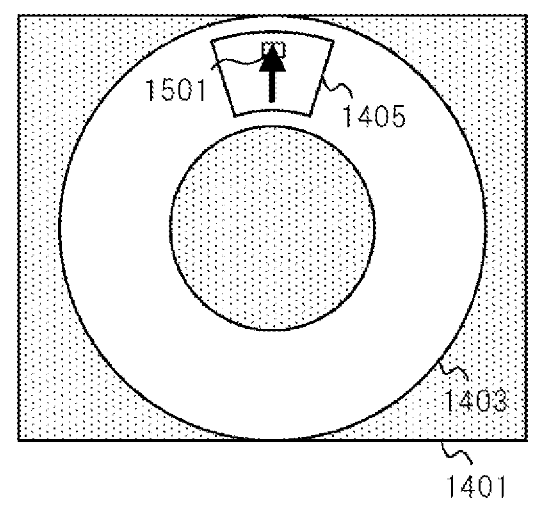
SECOND IMAGE OF LOWER CAMERA
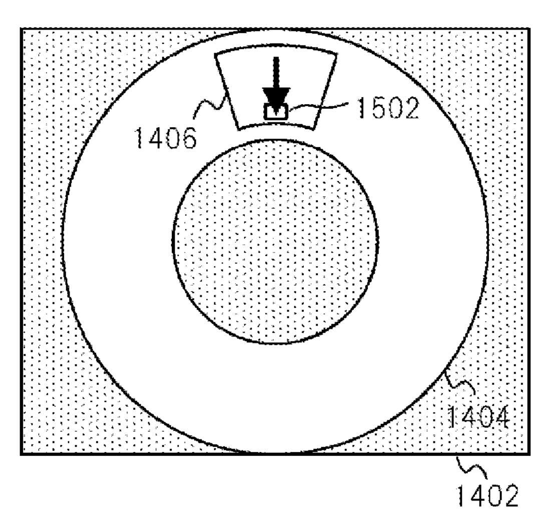
PORTION 1501
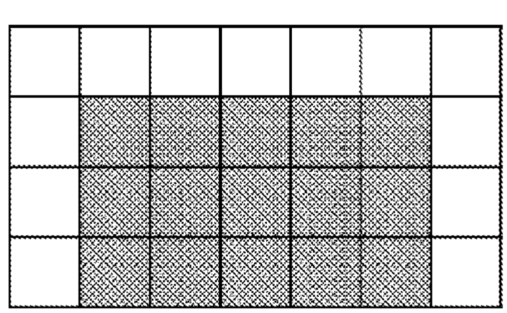
FIG. 17C
PORTION 1502
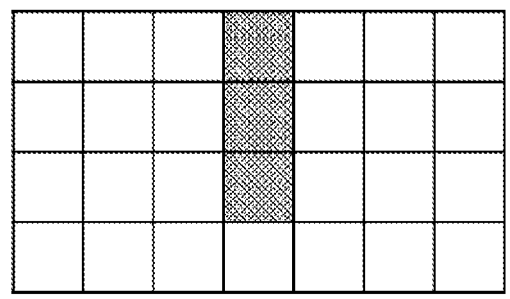
FIG. 17D

FIG. 23

GAUSSIAN FILTER
(WEIGHTING OF 5×5)

| | | | | |
|---|---|---|---|---|
| 1/256 | 4/256 | 6/256 | 4/256 | 1/256 |
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256 | 6/256 | 4/256 | 1/256 |

DISTANCE MEASURING APPARATUS AND METHOD

TECHNICAL FIELD

The present invention relates to a distance measuring technique.

BACKGROUND ART

With respect to techniques such as imaging and distance measurement, there is a case where three-dimensional sensing based on distance information of the entire periphery is required in addition to image e information of the entire periphery. There are many cases such as automatic driving and human flow analysis.

As one of techniques for acquiring two pieces of information and images related to a subject (in other words, an object) at a time, there is a technique using a stereo camera. The stereo camera images an object in respective directions from, for example, two cameras arranged on the left and right. The distance from the stereo camera to the object can be calculated based on the two captured images.

For example, JP 4388530 B2 (PTL 1) discloses a technique of including a first reflection unit, a second reflection unit, a third reflection unit, and a video imaging unit as an omnidirectional binocular vision video acquisition device of a single camera, and capturing omnidirectional images from a first viewpoint and a second viewpoint as binocular vision videos.

CITATION LIST

Patent Literature

PTL 1: JP 4388530 B2

SUMMARY OF INVENTION

Technical Problem

PTL 1 describes a binocular vision video acquisition device, in other words, a stereo camera, which can photograph images from two viewpoints, particularly omnidirectional images as in FIG. 8, by a single image sensor by using a plurality of hyperboloid mirrors, for example, as illustrated in FIGS. 5C and 7.

In the stereo camera and the distance measurement technique, the distance to the subject is calculated using two or more images obtained by photographing the same subject from two or more different viewpoints. At that time, in a case where there is a difference in the number of effective pixels between a plurality of captured images, performance of the calculated distance information is deteriorated.

Therefore, in a case where stereo photographing and distance measurement are performed, it is preferable to align the numbers of effective pixels between a plurality of images, in other words, to reduce the difference in the number of effective pixels.

An object of the present invention is to provide a technique capable of reducing a difference in the number of effective pixels between a plurality of images and enhancing performance, accuracy, and the like of distance measurement regarding stereo photographing and distance measurement.

Solution to Problem

A representative embodiment of the present disclosure has the following configurations. A distance measuring apparatus according to an embodiment includes: an imaging device that captures images in which a subject is captured; and a processing device that acquires the image from the imaging device and processes the image, in which the processing device includes: a characteristic matching image generating unit that inputs two or more images including a first image obtained by photographing the subject from a first viewpoint and a second image obtained by photographing the subject from a second viewpoint different from the first viewpoint among the images, and generates two or more images as characteristic matching images in which a characteristic of the first image and a characteristic of the second image are matched; and a distance measuring unit that calculates a distance to the subject by calculating a parallax based on the two or more images as the characteristic matching images, and in which the characteristic matching image generating unit generates the characteristic matching images by projecting a pixel of interest in at least one of the first image and the second image to a corresponding pixel position in the other image.

Advantageous Effects of Invention

According to the representative embodiment of the present disclosure, regarding stereo photographing and distance measurement, a difference in the number of effective pixels between a plurality of images can be reduced, and performance, accuracy, and the like of distance measurement can be improved. Problems, configurations, effects, and the like other than those described above are shown in the embodiments for carrying out the invention.

BRIEF DESCRIPTION OF DRAWINGS

FIGS. 3A to 3C illustrate an example of a captured image of the imaging device in the first embodiment.

FIGS. 17A to 17D illustrate a second example of the photographed image in the second embodiment.

FIG. 23 illustrates an example of a Gaussian filter in the fourth embodiment.

DESCRIPTION OF EMBODIMENTS

Figure 1:
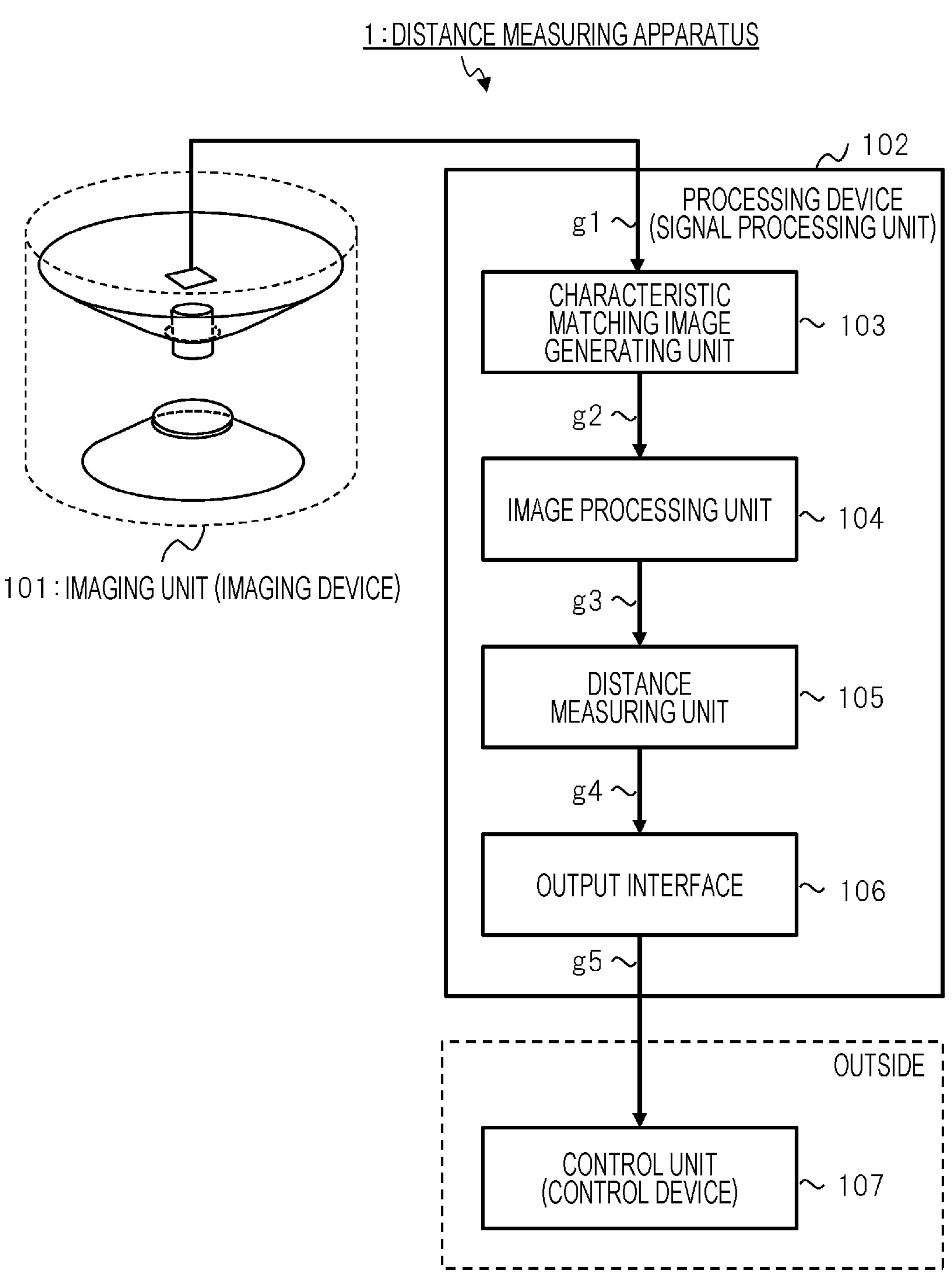
FIG. 1 illustrates a configuration of a distance measuring apparatus according to a first embodiment.

Hereinafter, embodiments of the present disclosure will be described in detail with reference to the drawings. In the drawings, the same parts are denoted by the same reference numerals in principle, and repeated description is omitted. In the drawings, representations of components may not represent actual positions, sizes, shapes, ranges, and the like to facilitate understanding of the invention. Members approximating or similar to the shape of the component or the like are also included in the scope of the present invention.

For the description, in a case where processing by a program is described, there is a case where a program, a function, a processing unit, and the like are mainly described. However, a main body as hardware for the program, the function, the processing unit, and the like is a processor, or a controller, a device, a computer, a system, and the like configured by the processor and the like. The computer executes processing according to the program read on the memory by the processor while appropriately using resources such as the memory and communication interface. As a result, a predetermined function, a processing unit, and the like are realized. The processor includes, for example, a semiconductor device such as a CPU or a GPU. The processor includes a device and a circuit capable of predetermined calculation. The processing is not limited to software program processing, and can be implemented by a dedicated circuit. As the dedicated circuit, FPGA, ASIC, CPLD, or the like can be applied.

The program may be installed in a target computer in advance as data, or may be distributed from a program source to the target computer as data. The program source may be a program distribution server on a communication network, or may be a non-transitory computer-readable storage medium (for example, a memory card). The program may include a plurality of modules. The computer system may include a plurality of devices. The computer system may include a client server system, a cloud computing system, an IoT system, or the like. The various data and information are configured by, for example, a structure such as a table and a list, but are not limited thereto. Expressions such as identification information, an identifier, an ID, a name, and a number can be replaced with each other.

First Embodiment

A distance measuring apparatus and a distance measuring method according to a first embodiment will be described with reference to FIGS. 1 to 12. A distance measuring apparatus 1 according to the first embodiment in FIG. 1 includes a characteristic matching image generating unit 103 in a processing device 102, and performs processing of matching characteristics of two images of two viewpoints captured by an imaging device 101 by the characteristic matching image generating unit 103. In other words, the characteristic matching image generating unit 103 corrects the difference in the characteristic between the two images by the image processing. A distance measuring unit 105 calculates a distance based on calculation of a parallax using the two images after the characteristic matching.

In the first embodiment, a concept of the number of effective pixels (also represented by symbol E) is used as one of the characteristics. The number of effective pixels E is an index indicating how many pixels of information a panoramic image as a plurality of images used for distance calculation holds with respect to an entire surrounding image as an original image as a plurality of images directly obtained from the imaging device 101. In other words, the number of effective pixels E is an amount indicating how much the panoramic image maintains the pixel information, the information amount, and the like of the original image. In other words, the number of effective pixels E is the number of pixels used for distance calculation in the pixel number distribution of the image of the same mapped image.

[Distance Measuring Apparatus (1)]

FIG. 1 illustrates a configuration example of the distance measuring apparatus 1 according to the first embodiment, and particularly illustrates a functional block configuration example of the processing device 102. The distance measuring apparatus 1 includes the imaging device 101 which is an imaging unit and the processing device 102 which is a signal processing unit. The imaging device 101 includes an optical system and an image sensor 111 illustrated in FIG. 2 to be described later.

[Imaging Device (1)]

Figure 2:
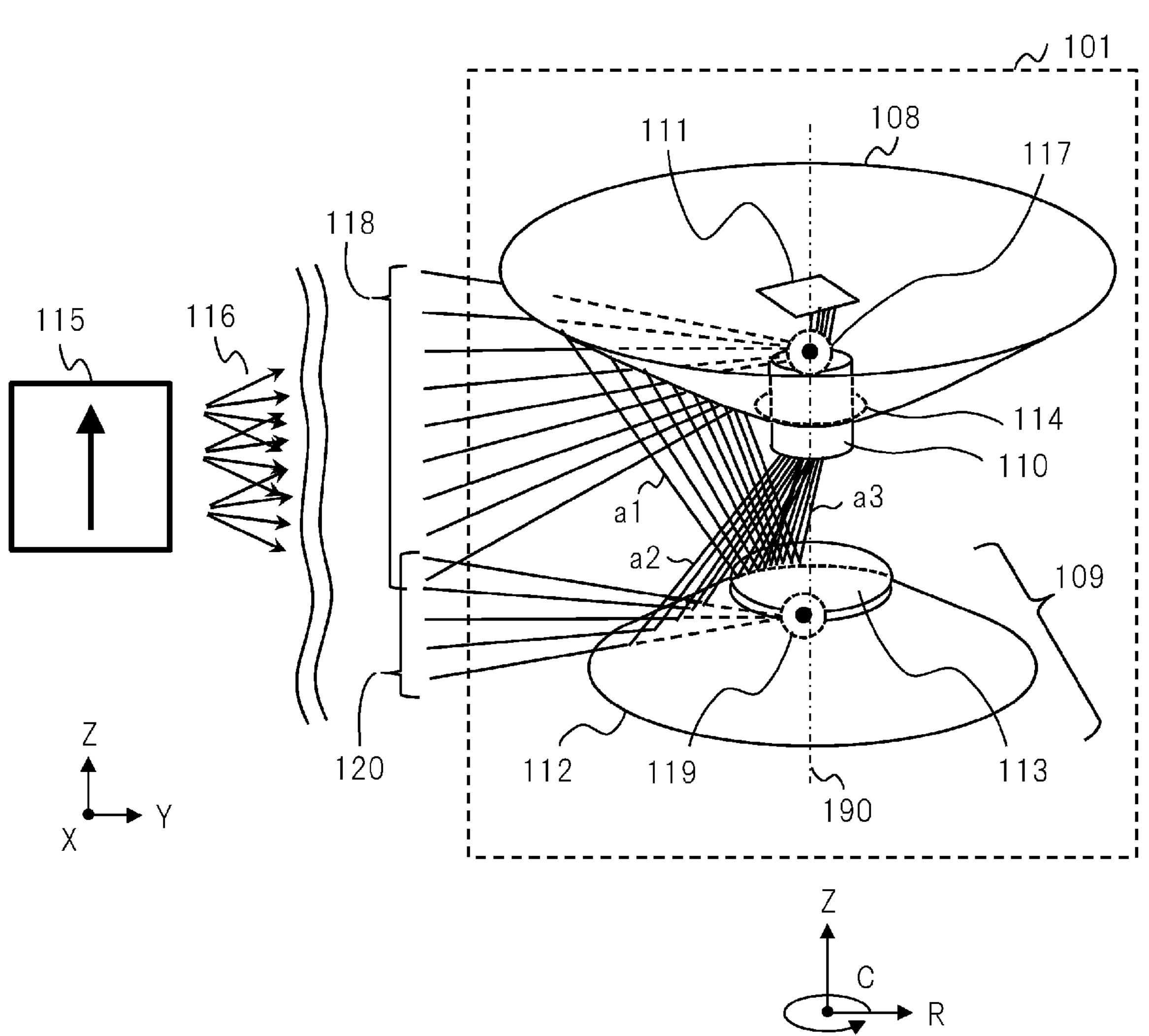
FIG. 2 illustrates a configuration example of an imaging device in the first embodiment.

FIG. 2 illustrates a configuration example of the optical system, the image sensor 111, and the like as a configuration example of the imaging device 101 in the distance measuring apparatus 1 according to the first embodiment. The optical system in the first embodiment includes components other than the image sensor 111, and includes an upper hyperboloid mirror 108, an outer peripheral hyperboloid mirror 112, an inner peripheral hyperboloid mirror 113, and a lens 110 which is an imaging optical system. The outer peripheral hyperboloid mirror 112 and the inner peripheral hyperboloid mirror 113 constitute a lower hyperboloid mirror 109. The image sensor 111, the lens 110 which is an imaging optical system, the upper hyperboloid mirror 108, the outer peripheral hyperboloid mirror 112, and the inner peripheral hyperboloid mirror 113 are arranged on the same axis 190 (in this example, an axis arranged in the Z direction illustrated) which is a rotational symmetry axis.

As illustrated in the drawing, the optical system in the first embodiment roughly includes a first portion arranged on the upper side in the Z direction and a second portion arranged on the lower side in the Z direction away from the first portion. Each of the first portion and the second portion is configured using a hyperboloid mirror. The first portion includes the upper hyperboloid mirror 108 and the lens 110 arranged generally concentrically. The second portion includes the outer peripheral hyperboloid mirror 112 and the inner peripheral hyperboloid mirror 113 arranged substantially concentrically.

A necessary number of the image sensors 111 is used according to the configuration of the optical system. In the first embodiment, the imaging device 101 includes one image sensor 111. Light 116 coming from a subject 115 includes light 118 and light 120, and these lights reach the image sensor 111 through the optical system. The image sensor 111 receives the reached light, converts the received light into an image signal, and outputs the image signal to the processing device 102. The image sensor 111 and the processing device 102 in FIG. 1 are connected by a signal line. Note that the subject 115 is schematically and simply illustrated, for example, as an arrow image. As a specific example, it may be understood that the arrowhead of the arrow image corresponds to the head of the person, and the root corresponds to the foot of the person.

Here, the imaging device 101 outputs a plurality of image signals obtained by photographing the subject 115 from different viewpoints according to the configuration of the optical system. In the first embodiment, the distance measuring apparatus 1 in FIG. 1 acquires, as stereo photographing, an image signal g1 corresponding to two images (also referred to as a first image and a second image) obtained by the imaging device 101 photographing the subject 115 from two different viewpoints (also referred to as a first viewpoint and a second viewpoint). In the two viewpoints, one first viewpoint (also referred to as an upper viewpoint) corresponds to a viewpoint for imaging the light 118 in FIG. 2, and the other second viewpoint (also referred to as a lower viewpoint) corresponds to a viewpoint for imaging the light 120 in FIG. 2. That is, the imaging device 101 in the first embodiment can obtain two images of the subject 115 from two viewpoints, particularly omnidirectional images, as one image through one common image sensor 111.

In other words, the imaging device 101 in the first embodiment includes, as the imaging optical system, a first optical system that projects a first mapped image corresponding to the first image to the image sensor, and a second optical system that projects a second mapped image corresponding to the second image to the image sensor. The imaging optical system includes a a plurality of hyperboloid mirrors as elements constituting the first optical system and the second optical system.

[Distance Measuring Apparatus (2)]

Returning to FIG. 1. The processing device 102 is a device on which a signal processing unit is mounted, and includes, for example, a computer, a semiconductor integrated circuit, and the like, and includes a processor, a memory, a communication interface, and the like. Implementation details of the processing device 102 are not limited, and may be mainly implemented by software program processing, may be mainly implemented by a dedicated circuit, or may be implemented by a combination of a plurality of devices.

The processing device 102 includes the characteristic matching image generating unit 103, the image processing unit 104, the distance measuring unit 105, and an output interface 106 as functional blocks realized by circuits and program processing.

The processing device 102 processes two images in the image signal g1 input from the image sensor 111 of the imaging device 101, and calculates distance information g4. The processing device 102 outputs the calculated distance information g4 and the like from the output interface 106 to the external control device 107 as output data g5. The external control device 107 is an arbitrary system or device using the distance measuring apparatus 1. Examples of the control device 107 include a computer such as an electronic control unit (ECU) of an automobile or a PC of a user.

Each element of the processing device 102 will be described. The characteristic matching image generating unit 103 performs characteristic matching processing on the input image signal g1, and outputs an image signal g2 including the characteristic matching image generated as a result of the processing to the image processing unit 104. The characteristic matching processing mentioned here is, for example, processing of matching the numbers of effective pixels E between images of a plurality of different viewpoints. The number of effective pixels E will be described later.

The image processing unit 104 performs image processing on the image signal g2 generated by the characteristic matching image generating unit 103. The image processing here is, for example, general geometric conversion, and refers to processing of converting a coordinate system of two images of the image signal g2, for example, a one-point perspective coordinate system, into another coordinate system, for example, a cylindrical coordinate system. In the first embodiment, the image before the geometric transformation is an image captured in all directions of 360 degrees around the axis 190 in FIG. 2, and is a concentric ring-shaped entire surrounding image as in FIGS. 3A, described later. The one-point perspective coordinate system before conversion is a coordinate system having parameters of a radial direction R and a peripheral direction C in the entire surrounding image as in FIG. 3A. The image after the conversion is a rectangular panoramic image illustrated in FIGS. 4 and 11 to be described later. The cylindrical coordinate system after the conversion is a coordinate system having parameters in the longitudinal direction and the lateral direction in the panoramic image in FIG. 4 and the like.

The distance measuring unit 105 performs distance calculation on an image signal g3 after the geometric transformation, that is, two panoramic images whose characteristics are matched, for example, as generally known stereo processing, and obtains distance information as a result of the calculation. The stereo processing is processing of calculating distance information from parallax information between images in a plurality of images acquired from a plurality of different viewpoints. The distance measuring unit 105 outputs the image signal g4 including the distance information calculated by the stereo processing and, if necessary, the image signal g3 (that is, the panoramic image) processed by the image processing unit 104 to the output interface 106. Note that the distance measuring unit 105 or another functional block may generate a distance image in an image format as the distance information. The distance image is an image in which the distance to the subject is expressed by color, luminance, or the like for each pixel.

The output interface 106 outputs the output data g5 including the image signal g4 such as distance information output from the distance measuring unit 105 to the external control device 107. The output interface 106 is a portion in which a communication interface with the control device 107 and the like are mounted.

The external control device 107 includes a processor, a memory, a communication interface, and the like. The control device 107 inputs and acquires the output data g5 from the distance measuring apparatus 1, and arbitrarily uses the output data g5. The control device 107 (for example, ECU) may control the processing device 102 and the imaging device 101 of the distance measuring apparatus 1. The control device 107 controls a control target such as an automobile using, for example, distance information of the output data g5. Examples of the control include automatic traveling control and alert output based on a distance to another vehicle or a person around the own vehicle.

[Imaging Device (2)]

Next, a configuration of the imaging device 101 in FIG. 2 will be described in detail. The imaging device 101 includes the upper hyperboloid mirror 108, the lower hyperboloid mirror 109, specifically, the lens 110 as an imaging optical system, and the image sensor 111. Further, the lower hyperboloid mirror 109 includes the outer peripheral hyperboloid mirror 112 and the inner peripheral hyperboloid mirror 113. These hyperboloid mirrors are arranged concentrically on the same axis 190.

The upper hyperboloid mirror 108 has an opening 114 near the top of the hyperboloid near the axis 190. The lens 110 which is an imaging optical system is arranged in the opening 114. The imaging optical system includes, for example, one lens or a set lens including a plurality of lenses. The image sensor 111 is arranged above the lens 114 which is an imaging optical system and in a space formed by the upper hyperboloid mirror 108.

In the lower hyperboloid mirror 109, the inner peripheral hyperboloid mirror 113 is arranged near the axis 190, and the outer peripheral hyperboloid mirror 112 is arranged concentrically with the inner peripheral hyperboloid mirror 113 and around the inner peripheral hyperboloid mirror 113. In other words, the inner peripheral hyperboloid mirror 113 is arranged at the top of the outer peripheral hyperboloid mirror 112.

When the component is rephrased, the upper hyperboloid mirror 108 is a first reflection device that reflects the first mapped image from the first viewpoint. The outer peripheral hyperboloid mirror 112 is a second reflection device that reflects the second mapped image from the second viewpoint. The inner peripheral hyperboloid mirror 113 is a third reflection device that further reflects the first mapped image reflected from the first reflection device. The lens 110, which is an imaging optical system, receives both the first mapped image reflected from the third reflection device via the first reflection device and the second mapped image reflected from the second reflection device and forms an image. Then, the image sensor 110 captures an image formed by the lens 110 as one image (FIG. 3A to be described later) including two mapped images from two viewpoints.

[Hyperboloid Mirrors]

Here, the properties of the hyperboloid mirrors of the upper hyperboloid mirror 108, the outer peripheral hyperboloid mirror 112, and the inner peripheral hyperboloid mirror 113 will be described. Each hyperboloid of the upper hyperboloid mirror 108, the outer peripheral hyperboloid mirror 112, and the inner peripheral hyperboloid mirror 113 corresponds to a case where the conic constant κ is smaller than −1 in the quadratic surface represented by Equation 1 described below. Here, c in Equation 1 is the curvature on the optical axis (in other words, the on-axis curvature), r is the radial distance from the optical axis, and z (r) is the sag amount of the surface in the optical axis direction with the vertex on the optical axis as the origin. The optical axis is the axis 190 in FIG. 2.

[Equation 1]

$$z(r) = \frac{cr^2}{1 + \sqrt{1 - (1 + \kappa)c^2 r^2}} \qquad \text{Equation 1}$$

A hyperboloid generally has two focal points. The coordinates of the focal points are expressed by Equation 2 described below with respect to the surface vertex. f represents a focal point. In±(positive/negative sign) of Equation 2, the sign + represents the coordinates of the focal point inside the hyperboloid, and the sign − represents the coordinates of the focal point outside the hyperboloid. Hereinafter, the focal point inside the hyperboloid is also referred to as a first focal point (or an inner focal point), and the focal point outside the hyperboloid is also referred to as a second focal point (or an outer focal point).

[Equation 2]

$$f = \frac{1}{c\left(1 \pm \sqrt{-\kappa}\right)} \qquad \text{Equation 2}$$

The hyperboloid mirror has a property of reflecting a light beam directed to the first focal point to a light beam focused on the second focal point. Conversely, the hyperboloid mirror has a property of reflecting the light beam emitted from the second focal point as if the light beam were emitted from the first focal point.

The subject 115 in FIG. 2 is arranged in the entire periphery or in a partial range of the entire periphery with respect to the imaging device 101 in the space. Note that, in FIG. 2, the coordinate system of the space in which the imaging device 101 is arranged is also indicated by (R, C, Z) or (X, Y, Z). R is a radial direction, C is a circumferential direction, and Z is a vertical direction. A certain subject 115 is arranged in a range of a certain angle in the peripheral direction C while being separated from the imaging device 101 in the radial direction R or the X direction.

Of the light 116 directed from the subject 115 to the imaging device 101, the light 118 (also referred to as first light) directed to a first focal point 117 (in other words, the upper viewpoint and the first viewpoint) which is a focal point located inside the upper hyperboloid mirror 108, and the light 120 (also referred to as the second light) directed to a first focal point 119 (in other words, the lower viewpoint and the second viewpoint) located inside the lower hyperboloid mirror 109, particularly the outer peripheral hyperboloid mirror 112 are given.

The light 118 directed to the first focal point 117 of the upper hyperboloid mirror 108 is reflected as light (for example, a light beam a1, in other words, reflected light a1) directed to the second focal point located outside of the two focal points of the upper hyperboloid mirror 108 due to its nature as a hyperboloid mirror.

At this time, as shown in FIG. 2, the first focal point which is the focal point on the inner side of the two focal points of the inner peripheral hyperboloid mirror 113 is arranged in the vicinity of the second focal point which is the focal point on the outer side of the upper hyperboloid mirror 108. The two focal points arranged so as to substantially coincide with each other in the vicinity range correspond to the focal point 119. In this arrangement, the light directed to the focal point 119 corresponding to the second focal point of the upper hyperboloid mirror 108 is emitted by the upper hyperboloid mirror 108 as light directed to the focal point 119 corresponding to the first focal point inside the inner peripheral hyperboloid mirror 113.

The light directed to the inner peripheral hyperboloid mirror 113 is reflected by the inner peripheral hyperboloid mirror 113 and becomes light (for example, a light beam a3, in other words, reflected light a3) directed to the lens 110 which is an imaging optical system.

On the other hand, of the light 116 from the subject 115, the light 120 (second light) directed to the first focal point 119 of the outer peripheral hyperboloid mirror 112 is reflected as light (for example, a light beam a2, in other words, reflected light a2) directed to the second focal point outside the outer peripheral hyperboloid mirror 112 due to its nature as a hyperboloid mirror. The reflected light is light directed to the lens 110 which is an imaging optical system.

The optical system in FIG. 2 includes the reflected light, that is, the reflected light (for example, the light beam a3) from the inner peripheral hyperboloid mirror 113 through the reflection on the upper hyperboloid mirror 108 corresponding to the first light 118 from the subject 115, and the reflected light (for example, the light beam a2) from the outer peripheral hyperboloid mirror 112 corresponding to the second light 120 from the subject 115. Then, the optical system has a configuration in which the lens 110 which is an imaging optical system is arranged so as to form an image of the reflected light on the image sensor 111.

With this configuration, the imaging device 101 can obtain, by one image sensor 111, two mapped images of the subject 115 viewed from two viewpoints of the focal point 117 corresponding to the upper viewpoint and the focal point 119 corresponding to the lower viewpoint. Similarly, in a case where the subject 115 is arranged around the entire circumference with respect to the imaging device 101, the imaging device 101 can obtain two omnidirectional images of the subject 115 viewed two viewpoints by one image sensor 111.

[Stereo Image]

FIG. 3A illustrates an example of an image 201, in other words, a stereo image, obtained when the subject 115 is photographed by the imaging device 101 of FIG. 2. The image 201 includes an upper viewpoint area 202 obtained by photographing the periphery from the focal point 117 corresponding to the upper viewpoint in FIG. 2 and a lower viewpoint area 203 obtained by photographing the periphery from the focal point 119 corresponding to the lower viewpoint. The entire image 201 is illustrated in a rectangular shape, and the upper viewpoint area 202 and the lower viewpoint area 203, which are two ring-shaped areas, are included in the rectangular area of the image 201. A portion other than the two ring-shaped areas in the image 201 may be a simple background pixel area, or may have a configuration in which there is no pixel in this portion, that is, a configuration in which a circular image can be obtained.

The upper viewpoint area 202 and the lower viewpoint area 203 are concentric ring-shaped image areas. In other words, the upper viewpoint area 202 is the first image and an inner peripheral side ring image area, and the lower viewpoint area 203 is the second image and an outer peripheral side ring image area. A circle near a center 200 of the upper viewpoint area 202 is missing as an area that cannot be imaged. The example of FIG. 3A illustrates a case where the upper viewpoint area 202 and the lower viewpoint area 203 are all included in the image 201. The present invention is not limited to this, and the area on which a mapped image is captured changes depending on the size and position of the imaging surface of the image sensor 111, characteristics of the imaging optical system 110, and the like. Therefore, the upper viewpoint area 202 and the lower viewpoint area 203 may not have a ring shape of the entire circumference of 360 degrees, and may have a partially missing configuration. In other words, in the peripheral direction C of the imaging device 101, only a range of a predetermined angle or position may be imaged.

In the stereo camera, the distance to the subject is calculated using two or more images obtained by photographing the same subject from two or more different viewpoints. At that time, as described above, in a case where there is a difference in the number of effective pixels E between a plurality of images, performance of the distance information may be deteriorated. Therefore, it is preferable to align the numbers of effective pixels E among a plurality of images to be subjected to distance measurement. Hereinafter, the above-described problems will be described in more detail.

The light imaged in the upper viewpoint area 202 in FIG. 3A is light reflected twice in total, once by the upper hyperboloid mirror 108 and once by the inner peripheral hyperboloid mirror 113 in FIG. 2. On the other hand, the light imaged in the lower viewpoint area 203 is the light reflected once by the outer peripheral hyperboloid mirror 112. Therefore, the respective mapped images formed in the upper viewpoint area 202 and the lower viewpoint area 203 are inverted with respect to the radial direction R by an even number and an odd number of reflections. A mapped image in the upper viewpoint area 202, for example, a mapped image (or an area) 204 shows the subject 115 in a direction from the inner periphery to the outer periphery in the radial direction R. For example, the head of the person indicated by an arrowhead is on the outer peripheral side. On the other hand, a mapped image in the lower viewpoint area 203, for example, a mapped image (or an area) 205 is inverted, and shows the subject 115 in a direction from the outer periphery to the inner periphery in the radial direction R. For example, the head of the person indicated by an arrowhead is on the inner peripheral side.

Since the upper viewpoint area 202 and the lower viewpoint area 203 are ring-shaped areas, the number of pixels in the peripheral direction C increases as the distance from the center 200 of the ring in the radial direction R increases.

As a result, in the mapped image 204 of the upper viewpoint area 202 and the mapped image 205 of the lower viewpoint area 203 capturing the same subject 115, the number of pixels in the peripheral direction C is different for the corresponding portions, for example, a portion 206 and a portion 207, in the mapped image 204 and the mapped image 205 indicating the same portion of the subject 115.

For example, FIGS. 3B and 3C illustrate enlarged views of the root portion of the arrow image as the same corresponding portion of the subject 115 between the mapped image 204 in the upper viewpoint area 202 and the mapped image 205 in the lower viewpoint area 203. FIG. 3C is an enlarged view of the portion 206 of the mapped image 204, and FIG. 3B is an enlarged view of the portion 207 of the mapped image 205. In these images, each square represents a pixel. The shaded gray portion is a pixel in which the root portion of the arrow image is shown. As described above, in the upper viewpoint area 202 and the lower viewpoint area 203, the number of pixels is different at corresponding portions showing the same portion of the subject 115. In the image of the portion 206 of FIG. 3C, the width of the root portion is one pixel, and in the image of the portion 207 of FIG. 3B, the width of the root portion is five pixels.

[Number of Pixels]

Figure 4:
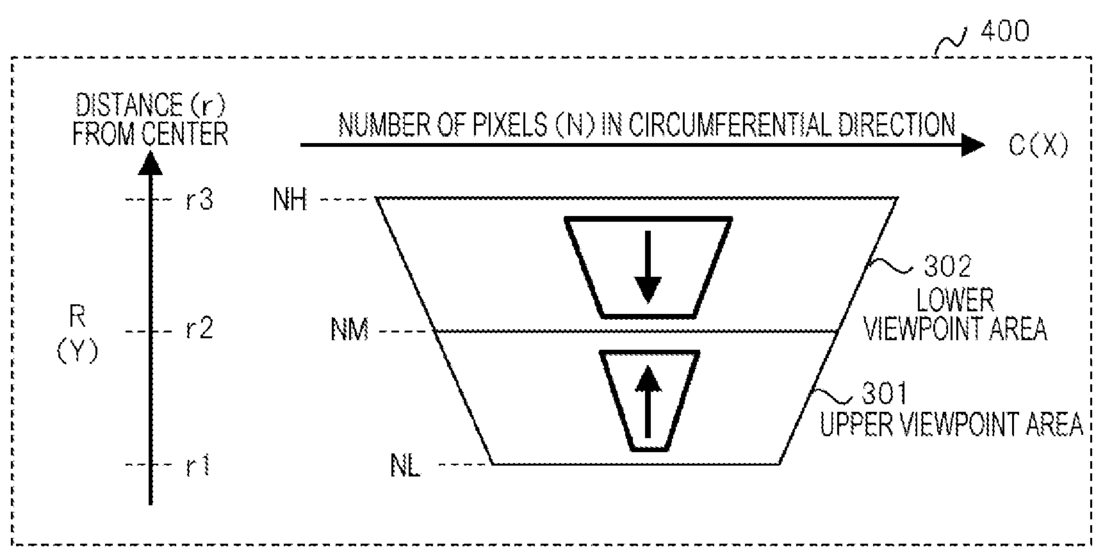
FIG. 4 illustrates a pixel number distribution of a photographed image in the first embodiment.

FIG. 4 is a schematic view showing a developed view of the ring-shaped upper viewpoint area 202 and lower viewpoint area 203 in FIG. 3A and showing a change in the number of pixels in the circumferential direction (peripheral direction C) depending on the distance from the center 200 of the ring in the radial direction R. Note that the number of pixels in the peripheral direction C is also represented as N. In FIG. 4, the distance from the center 200 in the radial direction R is also represented in the longitudinal direction (Y direction), and the pixel in the peripheral direction C is also represented in the lateral direction (X direction).

An upper viewpoint area 301 and a lower viewpoint area 302 after development are obtained by cutting the upper viewpoint area 202 and the lower viewpoint area 203 in FIG. 3A at a line 208 (one radius from the center 200 to the outermost circumference) in FIG. 3A and stretching the peripheral direction C horizontally (lateral direction and X direction in FIG. 4). In the area after the development, the peripheral direction C is a straight line in the lateral direction. In FIG. 4, each of the upper viewpoint area 301 and the lower viewpoint area 302 is a trapezoidal area.

Therefore, the length in the horizontal direction (X direction) in the upper viewpoint area 301 and the lower viewpoint area 302 after the development in FIG. 4 represents the number of pixels N in the circumferential direction. As the distance from the center 200 in the radial direction R increases, the number of pixels N in the circumferential direction increases, for example, NL (representing Low), NM (representing Middle), and NH (representing High), and the length in the horizontal direction also increases accordingly. The number of pixels NL is the number of pixels in the peripheral direction C at a distance r1 of the lower side of the upper viewpoint area 301 (the inner periphery of the ring in the upper viewpoint area 202). The number of pixels NM is the number of pixels in the peripheral direction C at a distance r2 of the upper side of the upper viewpoint area 301 (the outer periphery of the ring in the upper viewpoint area 202), in other words, a distance r2 of the lower side of the lower viewpoint area 302 (the inner periphery of the ring in the lower viewpoint area 203). The number of pixels NH is the number of pixels in the peripheral direction C at a distance r3 of the upper side of the lower viewpoint area 302 (the outer periphery of the ring in the lower viewpoint area 203). The number of pixels NL, NM, and NH is large in this order, and NL<NM<NH.

As a result, the difference in the number of pixels N at the corresponding portions in the upper viewpoint area 301 and the lower viewpoint area 302 in FIG. 4 can be grasped by the difference in the length in the horizontal direction (X direction). Due to the difference in the number of pixels N at the corresponding portions, the performance of distance measurement in the distance measuring unit 105 in the subsequent stage of FIG. 1 is deteriorated. This problem will be specifically described below.

Comparative Examples and Problems

Figure 5A:
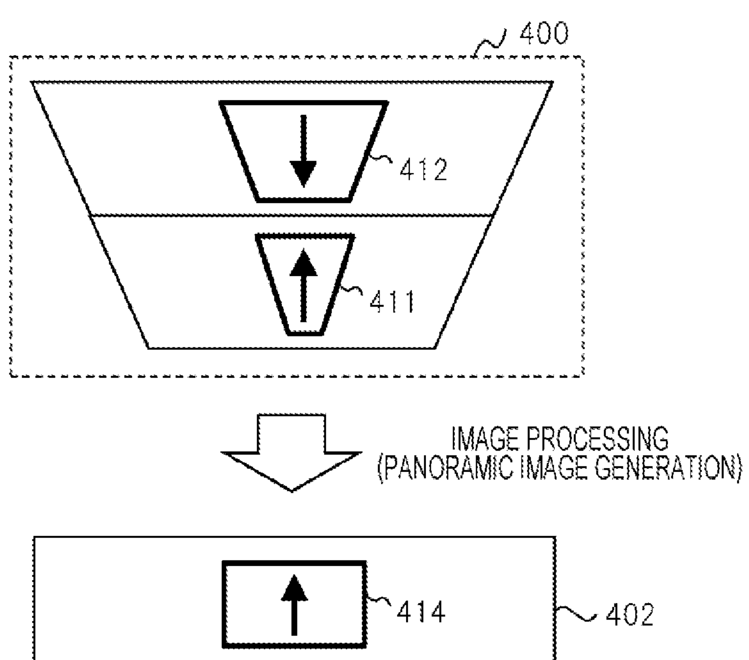
FIGS. 5A and 5B illustrate image processing of generating a panoramic image in a comparative example with respect to the first embodiment.
Figure 5B:
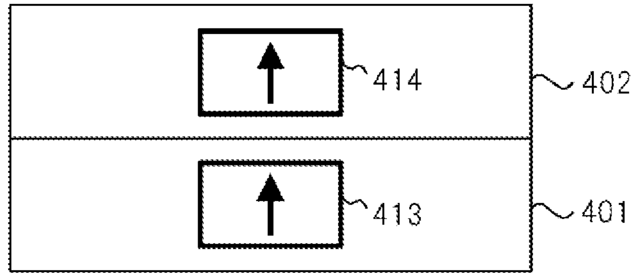

FIGS. 5A and 5B illustrates a state in which the image processing unit 104 in FIG. 1 performs image processing on the upper viewpoint area 301 and the lower viewpoint area 302 having different numbers of pixels N in the circumferential direction in FIG. 4 to generate images in which the numbers of pixels N in the circumferential direction are aligned in the distance measuring apparatus of the comparative example. This image processing is geometric transformation of generating panoramic images in which the numbers of pixels N in the circumferential direction are aligned. An unprocessed image 400 in FIG. 5A is the same as a developed image 400 in FIG. 4. Here, the image processing unit 104 and the like are components in the comparative example. In order to calculate the distance information in the distance measuring unit 105, images of the upper viewpoint area and the lower viewpoint area in which the numbers of pixels in the circumferential direction are aligned are required.

In the present comparative example, as illustrated in of FIG. 5B, by the image processing in the image processing unit 104, an upper panoramic image 401 and a lower panoramic image 402, which are images obtained by converting each of the upper viewpoint area and the lower viewpoint area into a rectangle and aligning the numbers of pixels N in the circumferential direction, are generated. At this time, the closer the number of effective pixels E at the corresponding portions between the upper panoramic image 401 and the lower panoramic image 402 is, the higher the distance measurement performance in the distance measuring unit 105 becomes.

Here, the number of effective pixels E is an index indicating how many pixels of information of the original image the panoramic image holds. For example, the number of effective pixels E in the peripheral direction C at a certain position in the radial direction R of the upper panoramic image 401 indicates how many pixels of information are held among the number of pixels in the peripheral direction C at the corresponding position in the radial direction R of the upper viewpoint area 301.

Note that, in the developed image (unprocessed image) 400, regarding inversion of an image in the radial direction R, for example, inversion of an image 411 and an image 412 related to the same mapped image, correction is performed at the time of generation of the panoramic image by the image processing. This correction is, for example, to invert the image obtained by converting the lower viewpoint area 302 into a rectangle in the radial direction R to obtain the lower panoramic image 402. Therefore, in FIG. 5B, in the upper panoramic image 401 and the lower panoramic image 402 after the image processing, for example, the directions of the mapped images captured in the image 413 and the image 414 are aligned.

Several methods can be considered as a method of generating panoramic images in which the numbers of pixels N in the circumferential direction are aligned as in FIG. 5B.

Comparative Example: Interpolation

Figures 6A, 6B, 6C:
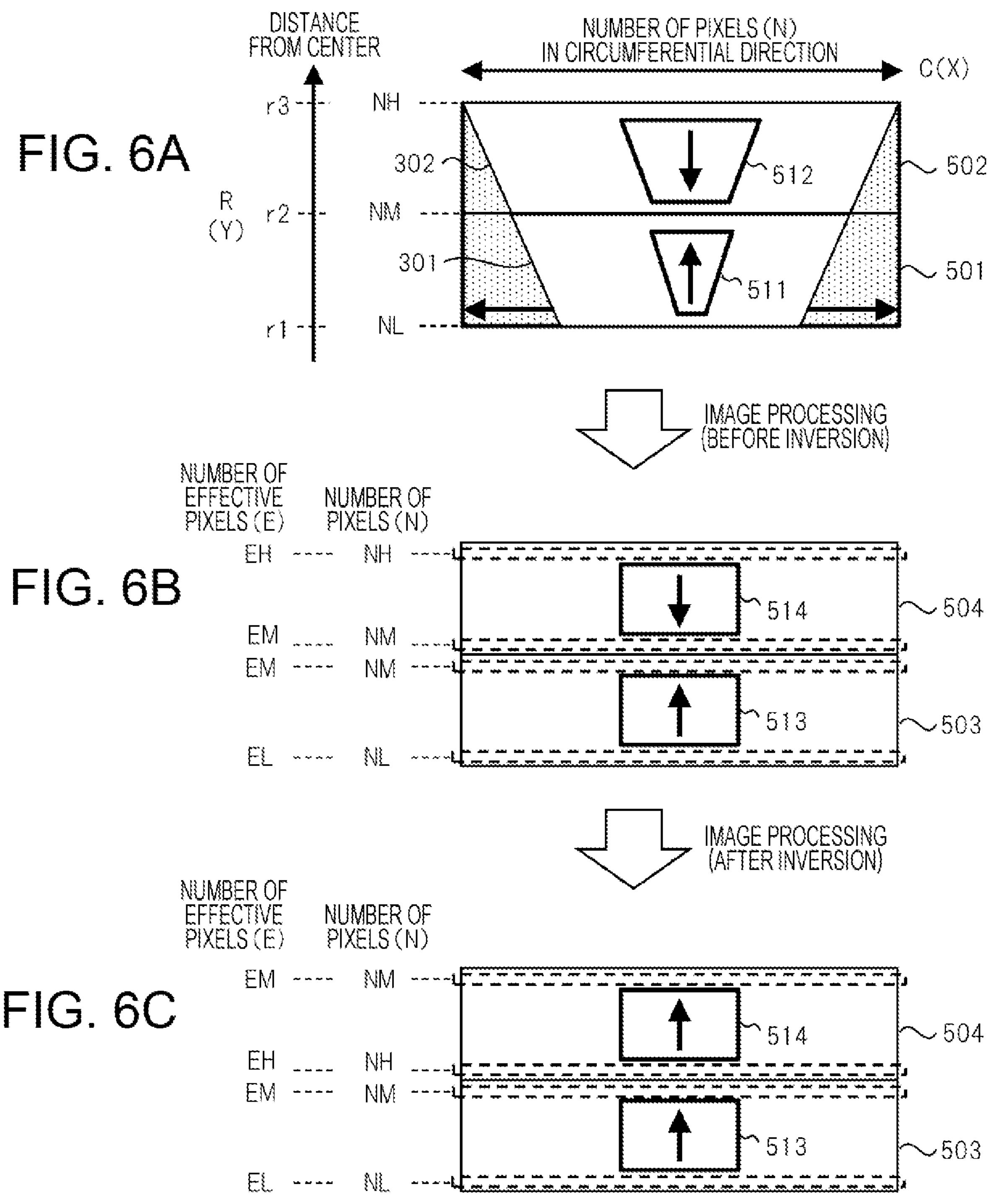
FIGS. 6A to 6C illustrate an interpolation method as a first example of a panoramic image generation method in the comparative example with respect to the first embodiment.

For example, FIGS. 6A to 6C illustrate a method using interpolation as one of the generation methods of the panoramic image in the distance measuring apparatus of the comparative example. This method is a method of performing interpolation processing such that trapezoidal pixel number distributions of the upper viewpoint area 301 and the lower viewpoint area 302 become pixel number distributions of a rectangle 501 and a rectangle 502 as illustrated in FIG. 6A. This method is a method of performing the interpolation processing so as to obtain a pixel number distribution corresponding to the largest number of pixels in the radial direction R (in this example, the number of pixels NH at the distance r3) in the lower viewpoint area 302 (in other words, the trapezoidal image) in which the number of pixels N in the circumferential direction is larger. In other words, this method is a method of interpolating the number of pixels N in the peripheral direction C at each position in the radial direction R so as to align the number of pixels N in the circumferential direction R with the largest area in the two trapezoidal images.

The image of the rectangle 501 is an image after the image processing of the interpolation from the upper viewpoint area 301. The image of the rectangle 502 is an image after the image processing of the interpolation from the lower viewpoint area 302. As illustrated in FIG. 6B, the image of the rectangle 501 corresponding to the upper viewpoint area 301 is a panoramic image 503 after the interpolation corresponding to the upper viewpoint area 301 before vertical inversion, and the image of the rectangle 502 corresponding to the lower viewpoint area 302 is a panoramic image 504 after the interpolation corresponding to the lower viewpoint area 302. Furthermore, in these images, the panoramic image 504 is vertically inverted in order to align the vertical directions of the images. After the inversion, as illustrated in FIG. 6C, the panoramic image 503 and the panoramic image 504 after the interpolation are obtained.

The interpolation is, for example, the following processing. For example, in the trapezoid of the upper viewpoint area 301 in FIG. 6A, the number of pixels N in the circumferential direction at the position of the distance r1 in the radial direction R corresponding to the short side of the trapezoid is NL. In the larger trapezoid of the lower viewpoint area 302, the number of pixels N in the circumferential direction at the position of the distance r3 in the radial direction R corresponding to the long side of the trapezoid is NH. Interpolation processing is performed such that the number of pixels NL on the short side of the trapezoid of the upper viewpoint area 301 is matched with the number of pixels NH on the long side of the trapezoid of the lower viewpoint area 302. In this interpolation processing, in a pixel group of one line of the number of original pixels NL, new pixels are uniformly inserted between the original pixels. Each new pixel stores a new pixel value calculated from pixel values of surrounding original pixels.

In a case where panoramic images are generated by such a method using interior decoration, the number of effective pixels E of the upper panoramic image 503 and the number of effective pixels E of the lower panoramic image 504 in FIG. 6C have different areas. For example, in two images of the upper panoramic image 503 and the lower panoramic image 504, the numbers of effective pixels E are aligned as the numbers of effective pixels EM in areas of the numbers of pixels NM (illustrated by broken-line frames) as the numbers of pixels N in the peripheral direction C on the upper sides of the mapped images in the radial direction R (in other words, on the upper sides of the captured images 511 and 512). On the other hand, in the two images, the numbers of effective pixels E are the number of effective pixels EL and the number of effective pixels EH on the lower sides of the images in the radial direction R and in the areas of the number of pixels NL and the number of pixels NM (illustrated in broken-line frames) as the numbers of pixels N in the peripheral direction C, and they are different. Since NL<NM is satisfied as the number of pixels, EL<EH is satisfied as the number of effective pixels. In the two images of the upper panoramic image 503 and the lower panoramic image 504, the relationship of the number of effective pixels E is EL<EM<EH.

In the comparative example, the distance measuring unit 105 in the subsequent stage of FIG. 1 detects corresponding portions between the upper panoramic image 503 and the lower panoramic image 504 (for example, corresponding portions between the image 513 and the image 514), and then, calculates a parallax at the corresponding portions. However, at that time, in the areas having different numbers s of effective pixels E, the detection accuracy of the corresponding points decreases, and as a result, the performance of the calculation of the parallax and the distance measurement is deteriorated.

Comparative Example: Downsampling

Figures 7A, 7B, 7C:
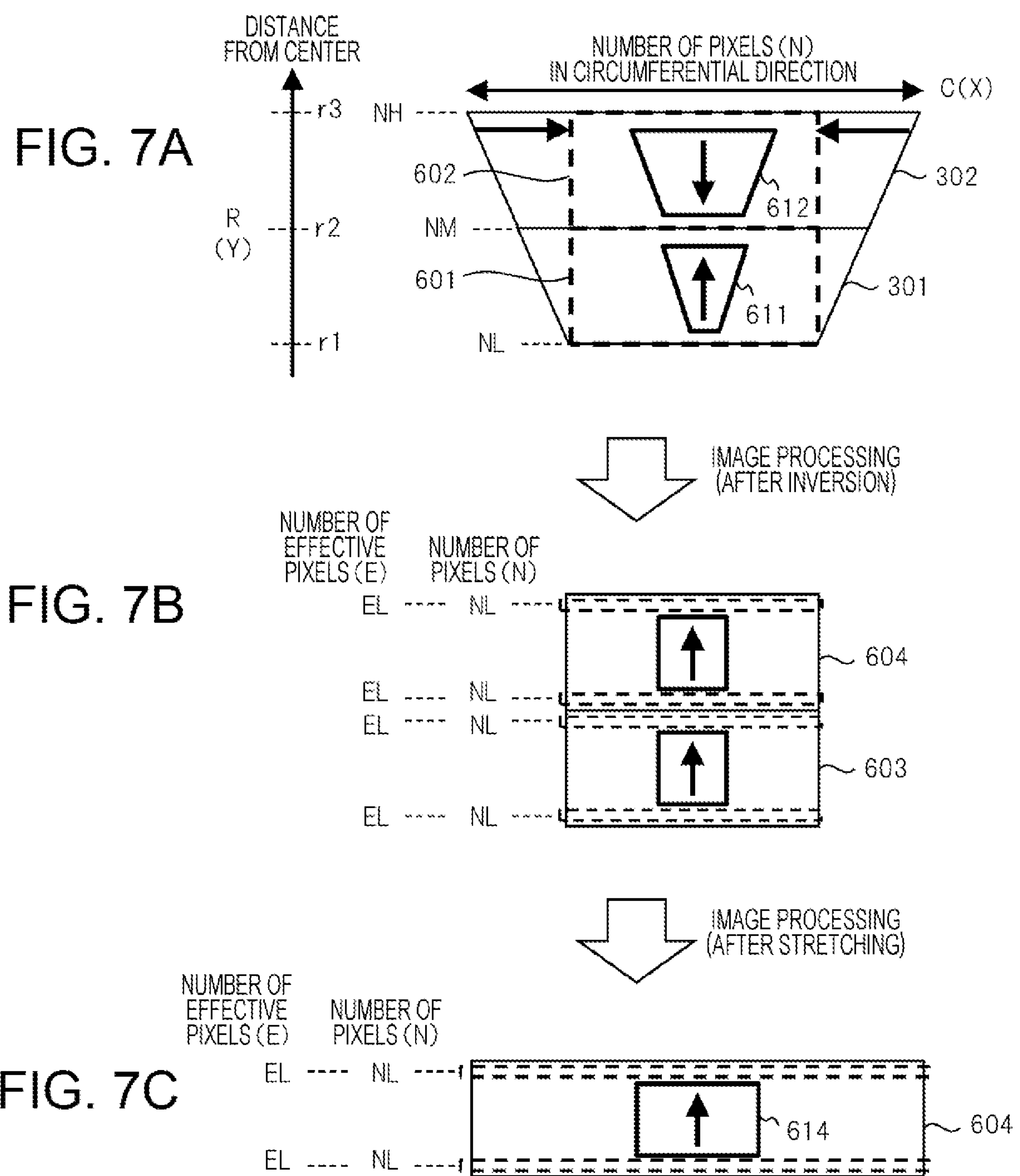
FIGS. 7A to 7C illustrate a downsampling method as a second example of the panoramic image generation method in the comparative example with respect to the first embodiment.

FIGS. 7A to 7C illustrate a method using downsampling as another method of generating panoramic images in which the numbers of pixels are aligned. As illustrated in FIG. 7A, this method is a method of performing downsampling such that trapezoidal pixel number distributions of the upper viewpoint area 301 and the lower viewpoint area 302 become pixel number distributions of a rectangle 601 and a rectangle 602. In other words, this method is a method of downsampling the number of pixels N in the peripheral direction C at each position in the radial direction R so as to align the number of pixels N in the circumferential direction R with the smallest area in the two trapezoidal images.

The image of the rectangle 601 is an image after the image processing of downsampling from the upper viewpoint area 301. The image of the rectangle 602 is an image after the image processing of downsampling from the lower viewpoint area 302. As illustrated in FIG. 7B, the image of the rectangle 601 corresponding to the upper viewpoint area 301 becomes the panoramic image 603 and the panoramic image 604 after the downsampling after the inversion. The panoramic image 603 and the panoramic image 604 illustrated in (B) are stretched with respect to the length of the side of the number of pixels NL in (A).

The downsampling is, for example, the following processing. For example, in the trapezoid of the upper viewpoint area 301 in FIG. 7A, the number of pixels N in the circumferential direction at the position of the distance r1 in the radial direction R corresponding to the short side of the trapezoid is NL. In the larger trapezoid of the lower viewpoint area 302, the number of pixels N in the circumferential direction at the position of the distance r3 in the radial direction R corresponding to the long side of the trapezoid is NH. Downsampling processing is performed such that the number of pixels NH on the long side of the trapezoid of the lower viewpoint area 302 is matched with the number of pixels NL on the trapezoidal short side of the upper viewpoint area 301. In this processing, in a pixel group of one line of the number of original pixels NH, pixels to be uniformly thinned out are provided between the original pixels. Each of the new pixels remaining after the thinning stores a new pixel value calculated from the pixel value of the new pixel and the pixel values of surrounding thinned pixels.

As another downsampling processing example, in a pixel group of one line of the number of original pixels NH, pixels to be thinned out are provided uniformly or collectively in a partial area in the peripheral direction C, and the pixel values of the pixels to be thinned out are not reflected in the new pixels and are deleted.

In a case where panoramic images are generated by such a method using downsampling, as in FIG. 7B, the number of effective pixels E of the upper panoramic image 603 and the number of effective pixels E of the lower panoramic image 604 are all the number of effective pixels EL corresponding to the number of pixels NL at each position in the radial direction R. That is, the numbers of effective pixels E are aligned between the upper panoramic image 603 and the lower panoramic image 604 as a whole.

Further, FIG. 7C illustrates an image obtained by stretching the number of pixels NL in the peripheral direction C from the two images of (B) so as to be matched with the number of pixels NH of the original longest side.

Therefore, in this method, the distance measurement performance is not deteriorated due to the difference in the number of effective pixels E. However, since the downsampling is performed in this method, the number of pixels capable of distance measurement decreases in the two images as a whole. For example, as for the number of pixels NH on the long side of the trapezoid of the lower viewpoint area 302, the number of pixels whose distance can be measured decreases like the number of effective pixels EL after the downsampling. Therefore, it is desirable to maintain the number of effective pixels E in the panoramic image as much as possible with respect to the number of pixels N in the original image.

When generating a rectangular panoramic image as in FIGS. 5A and 5B by image processing for distance calculation from an original image such as the ring-shaped image in FIG. 3A or the trapezoidal image in FIG. 4, there are two viewpoints when the above-described problems are organized. A first aspect is to align the numbers of effective pixels E at the positions in the radial direction R as much as possible, in other words, to reduce the difference in the number of effective pixels E as much as possible, after image processing, in other words, after geometric transformation, for two images of the upper viewpoint area 301 and the lower viewpoint area 302. A second aspect is to maintain the numbers of pixels capable of distance measurement as much as possible with respect to the original images after image processing, in other words, after geometric transformation, with respect to the two images.

In order to solve the above problem, the distance measuring apparatus 1 according to the first embodiment has a configuration described below. In the distance measuring apparatus 1, when generating the panoramic images from the original images, the characteristic matching image generating unit 103 in FIG. 1 performs characteristic matching image generation processing such that the numbers of effective pixels E at the corresponding portions of the images can be aligned while maintaining the numbers of effective pixels E (in other words, the numbers of pixels capable of calculating the distance) to the maximum. That is, in the first embodiment, the characteristic matching image is generated so as to satisfy the above two viewpoints in a well-balanced manner. Hereinafter, processing, effects, and the like performed by the characteristic matching image generating unit 103 will be described.

In the first embodiment, the characteristic matching image generating unit 103 projects the pixels of the lower viewpoint area 203 in the image 201 of FIG. 3A based on the input image signal g1 to the corresponding pixel positions as the image of the upper viewpoint area 202 (FIG. 8), thereby generating the characteristic matching images in which the numbers of effective pixels E are matched.

[Characteristic Matching Image Generation and Projection]

Figure 8:
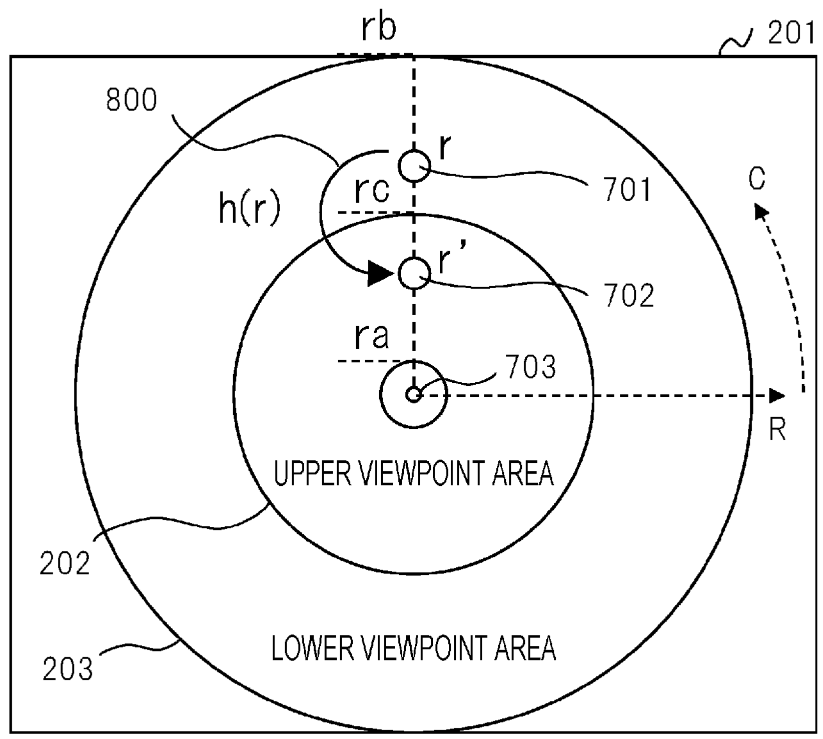
FIG. 8 is a schematic explanatory view of projection in the first embodiment.

FIG. 8 is an explanatory view schematically illustrating a state in which the characteristic matching image generating unit 103 projects a pixel of the lower viewpoint area 203 in the image 201 to a corresponding pixel position of the upper viewpoint area 202 in the first embodiment. The characteristic matching image generating unit 103 performs projection 800 (also indicated by an arrow or "h (r)") on a pixel of interest 701 in the lower viewpoint area 203 to a corresponding pixel position 702 in the upper viewpoint area 202 corresponding to the pixel of interest 701. The pixel of interest 701 is a pixel at a position of a distance r in the radial direction R. The corresponding pixel position 702 is a position at a distance r' in the radial direction R. The characteristic matching image generating unit 103 performs the same operation as the projection 800 for all the pixels in the lower viewpoint area 203. This completes the projection of the lower viewpoint area 203. Note that the projection in FIG. 8 is a concept based on mathematical projection.

Next, a method of determining the corresponding pixel position 702 for the pixel of interest 701 in the first embodiment will be described. As illustrated in FIG. 8, a distance from a center 703 of the ring between the upper viewpoint area 202 and the lower viewpoint area 203 to the pixel of interest 701 in the radial direction R is r, and a distance from the center 703 to the corresponding pixel position 702 is r'. In this case, a function h (r) satisfying Equation 3 described below is referred to as a projection function here.

[Equation 3]

$$r' = h(r) \qquad \text{Equation 3}$$

Determination of the corresponding pixel position 702 for the pixel of interest 701 corresponds to determination of the projection function h (r). For determining the projection function, for example, an image height characteristic of the optical system may be used.

[Image Height Characteristic of Optical System]

Figure 9:
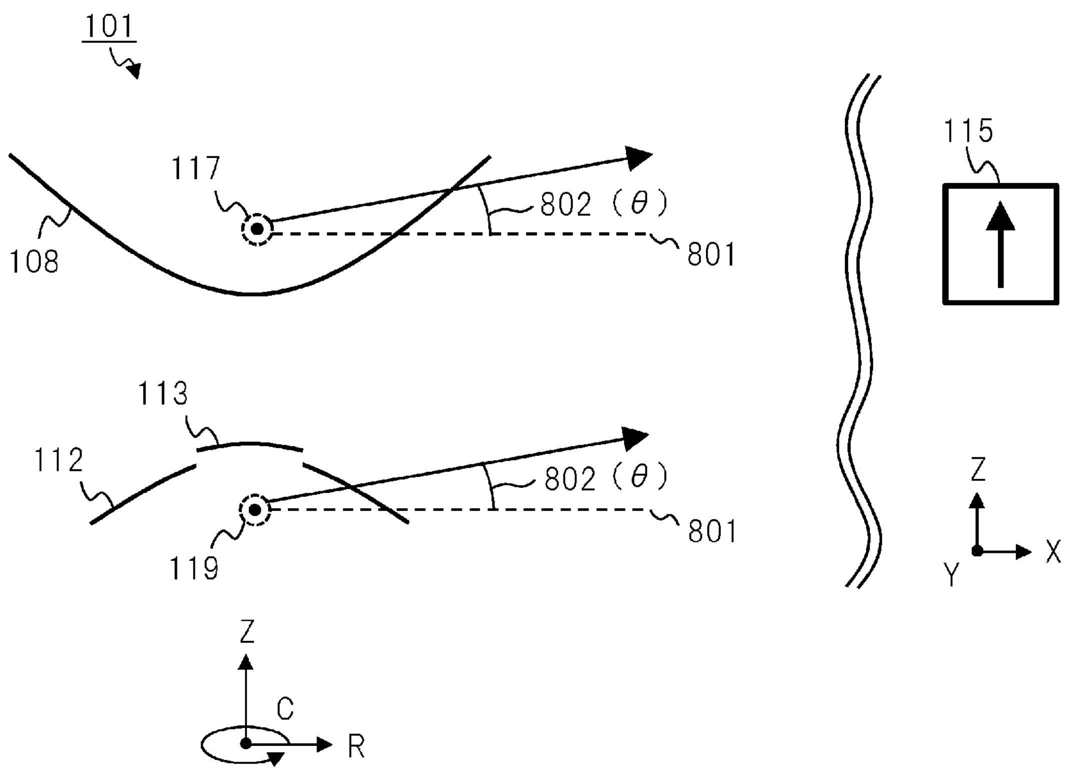
FIG. 9 is an explanatory view illustrating an elevation angle and an image height characteristic of the imaging device in the first embodiment.

FIG. 9 is a cross-sectional view on a plane including the upper focal point 117 and the lower focal point 119 of the imaging device 101 of FIG. 2, and is an explanatory view illustrating an elevation angle when the imaging device 101 is used as a reference. A signed angle in the vertical direction from a horizontal line 801 (for example, corresponding to the X direction) when the imaging device 101 is used as a reference is an elevation angle 802 (size: θ). The image height characteristic is a characteristic indicating at which position in the image 201 in FIG. 3A the subject 115 in the direction of the elevation angle θ is captured from the imaging device 101.

The image height characteristic of the upper viewpoint area 202 is represented by r'=f (θ), and the image height characteristic of the lower viewpoint area 203 is represented by r=g (θ). In this case, the subject 115 distant from the imaging device 101 and at 0=00 is imaged at positions with image heights of r'=f (θ0) and r=g (θ0). Therefore, based on the distance r from the center 703 to the pixel of interest 701, the image height characteristic f (θ) of the upper viewpoint area 202, and the image height characteristic g (θ) of the lower viewpoint area 203, the distance r' from the center 703 to the corresponding pixel position 702 can be calculated by Equation 4 described below.

[Equation 4]

$$r' = f(\theta) = f\left(g^{-1}(r)\right) \qquad \text{Equation 4}$$

Therefore, the projection function h (r) is expressed by Equation 5 described below.

[Equation 5]

$$h(r) = f\left(g^{-1}(r)\right) \qquad \text{Equation 5}$$

With reference to FIG. 8, a specific example of a projection function using an image height characteristic will be described for the imaging device 101 in the first embodiment. A radius at a position closest to the center 703 in the upper viewpoint area 202 is defined as ra, and a radius at a position farthest from the center 703 in the lower viewpoint area 203 is defined as rb. The radius of the position of the boundary between the upper viewpoint area 202 and the lower viewpoint area 203 is defined as rc. Here, the image height characteristics of the upper viewpoint area 202 and the lower viewpoint area 203 are the same but inverted. The configuration related to the image height characteristic corresponds to a case where the upper hyperboloid mirror 108 and the lower hyperboloid mirror 109 are configured using the same hyperboloid mirror in the optical system (FIG. 2) in the first embodiment. In this case, the image height characteristic of the upper viewpoint area 202 is r=f (θ), and the image height characteristic of the lower viewpoint area 203 is expressed by Equation 6 described below.

[Equation 6]

$$a+b-r=f(\theta) \quad \text{Equation 6}$$

Therefore, the projection function h (r) can be calculated as Equation 7 described below using Equation 5.

[Equation 7]

$$f(r)=a+b-r \quad \text{Equation 7}$$

[Characteristic Matching Processing and Projection]

Figure 10:
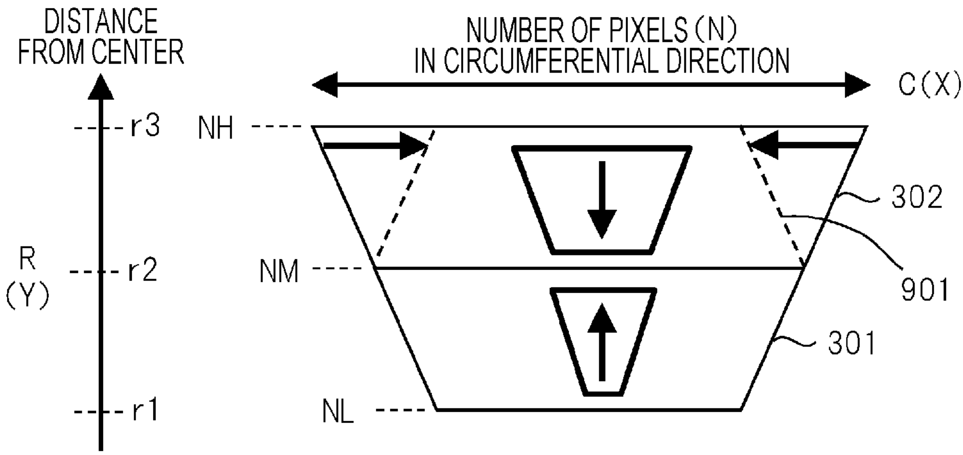
FIG. 10 illustrates a change in pixel number distribution of characteristic matching processing in the first embodiment.

Next, effects of the above-described characteristic matching processing will be described with reference to FIGS. 3, 8, 10, and 11. FIG. 10 is an explanatory view illustrating a change in the number of pixels due to the characteristic matching processing (in particular, projection) by the characteristic matching processing unit 103 in the distance measuring apparatus 1 according to the first embodiment. The target image is similar to the image 201 in FIG. 3A and the two images (the upper viewpoint area 301 and the lower viewpoint area 302) in FIG. 4. In FIG. 10, the characteristic matching processing unit 103 performs characteristic matching processing of projecting pixels in the lower viewpoint area 302 to corresponding pixel positions in the upper viewpoint area 301. This characteristic matching processing corresponds to downsampling the pixel number distribution of the lower viewpoint area 302 in accordance with the pixel number distribution of the upper viewpoint area 302 like a trapezoid 901.

As a comparative example of the first embodiment, the upper viewpoint area 301 and the lower viewpoint area 302 in FIG. 3A are cut and opened by the broken line 208, so that the trapezoidal upper viewpoint area 301 and the lower viewpoint area 302 in FIG. 10 are actually created, and the trapezoidal lower viewpoint area 302 is downsampled to be the smaller trapezoidal 901 in FIG. 10. This method also enables processing similar to the projection processing illustrated in FIG. 8. However, the method of this comparative example requires two processings of developing the ring area into a trapezoid as in the image of FIG. 3A and downsampling the trapezoid area. The number of processings in this comparative example is one larger than that in the projection processing illustrated in FIG. 8. Therefore, the projection processing illustrated in FIG. 8 has an advantage that an error accumulated by each processing is smaller.

[Projection and Panoramic Image Generation]

Figures 11A, 11B:
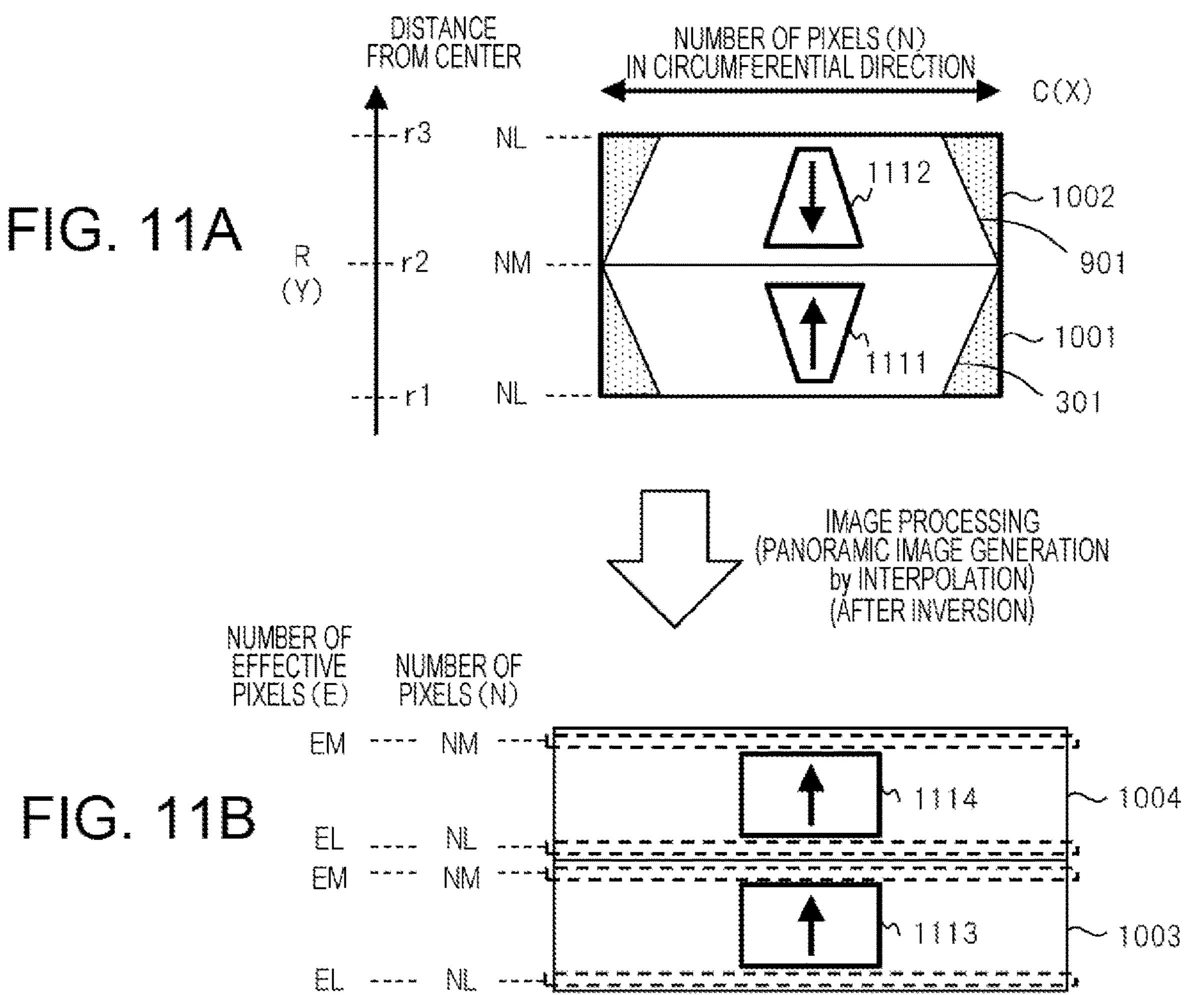
FIGS. 11A and 11B illustrate an example of projection and panoramic image generation in the first embodiment.

FIGS. 11A and 11B are schematic views illustrating a state in which a panoramic image is generated from an image after characteristic matching processing by projection. FIG. 11A illustrates the trapezoidal image 301 of the upper viewpoint area 301 and the trapezoidal image 901 of the lower viewpoint area 302 as characteristic matching images after the characteristic matching processing, and a rectangular image 1001 and a rectangular image 1002 as the images the interpolation processing from these two images. FIG. 11B illustrates a panoramic image 1003 of the upper viewpoint area 301 and a panoramic image 1004 of the lower viewpoint area 302 as rectangular panoramic images after generation of panoramic images by interpolation processing is performed and after inversion as image processing from the rectangular images of FIG. 11A.

Using the image 301 and the image 901 after the characteristic matching processing by projection described above, the distance measuring apparatus 1 causes the image processing unit 104 in FIG. 1 to perform interpolation transformation so as to obtain the rectangles 1001 and 1002 illustrated in FIG. 11A. As a result, the upper panoramic image 1003 and the lower panoramic image 1004 illustrated in FIG. 11B are generated.

In the first embodiment, the image of the upper viewpoint area 202 in FIG. 3A is used as it is for the geometric transformation by the image processing unit 104. On the other hand, the projection in FIG. 8 is applied to the image of the lower viewpoint area 203, and a characteristic matching image is generated as an image after the projection as in the change from the trapezoidal image 301 to the image 901 in FIG. 10. The characteristic matching image after the projection is used for the geometric transformation by the image processing unit 104, and a panoramic image as in FIGS. 11A and 11B are generated.

The method of FIGS. 11A and 11B is different from the interpolation method of the comparative example described above with reference to FIGS. 6A to 6C, and in the upper panoramic image 1003 and the lower panoramic image 1004 generated by this method, the number of effective pixels E on the upper side of the image is the number of effective pixels EM corresponding to the number of pixels NM, and the number of effective pixels E on the lower side of the image is the number of effective pixels EL corresponding to the number of pixels NL. That is, after the conversion, two images 1113 and 1114 related to the same mapped image in the upper viewpoint area 301 and the lower viewpoint area 302 have the same distribution of the number of effective pixels E at each position in the radial direction R. Each of the upper panoramic image 1003 and the lower panoramic image 1004 has a distribution that changes from the number of effective pixels EL to the number of effective pixels EM, for example, from the lower side to the upper side of the images 1113 and 1114 of the subject in the radial direction R. The image 1113 corresponds to the image 1111 before conversion, and the image 1114 corresponds to the image 1112 before conversion. In other words, the method in the first embodiment has a smaller difference in the number of effective pixels E between the upper and lower two images than the method in the comparative example.

In addition, in the method using the downsampling of the comparative example described with reference to FIGS. 7A to 7C, the total number of effective pixels E of the panoramic image is EL. On the other hand, in the upper panoramic image 1003 and the lower panoramic image 1004 generated by the method in the first embodiment, the number of effective pixels E on the upper side of the image is EM, and the number of effective pixels E is maintained with respect to the original image. In other words, the method in the first embodiment has a larger degree of maintaining the number of effective pixels E (the number of pixels capable of distance measurement) in the entire image than the method in the comparative example.

As described above, according to the characteristic matching processing in the first embodiment, the number of effective pixels E when the original image is converted into the panoramic image is maintained to the maximum, and matching of the numbers of effective pixels E at the corresponding portions of the images of the subject is realized. That is, in the first embodiment, the panoramic images are generated so as to satisfy the above-described two viewpoints in a well-balanced manner. Then, the distance calculation can be realized with high accuracy using the panoramic image.

[Distance Measurement Flow]

Next, processing examples performed by the characteristic matching image generating unit 103, the image processing unit 104, and the distance measuring unit 105 by the processor of the processing device 102 of FIG. 1 in the first embodiment will be described with reference to the flow of FIG. 12. First, in step S101, the processing device 102 refers to a projection function corresponding to the image height characteristic of the imaging device 101 stored in advance. This projection function is calculated in advance based on FIGS. 8 to 9 described above and stored in a memory as data and information.

Next, in step S102, the characteristic matching image generating unit 103 uses the projection function referred to in step S101 to project the lower viewpoint area 203 in FIG. 8 to the corresponding portion of the upper viewpoint area 202, thereby generating the image 301 and the image 901 as the characteristic matching images as in FIGS. 10 and 11.

Next, in step S103, the image processing unit 104 generates a panoramic image using the characteristic matching image (the image signal g2 in FIG. 1) created in step S102.

Next, in step S104, the distance measuring unit 105 performs distance measurement using the panoramic image (the image signal g3 in FIG. 1) created in step S103.

Next, in step S105, in a case where the image subjected to the distance measurement in step S104 is one frame in the moving image, the processing device 102 determines whether or not to perform the distance measurement on the image of the next frame. When the distance measurement is also performed for the next frame (S105—YES), the processing device 102 returns to step S102 and performs the same processing. When the distance measurement of the next frame is not performed or when the next frame does not exist (NO in S105), the processing device 102 ends the processing of this flow. The output interface 106 outputs the data after the processing (output data g5 in FIG. 1).

[Distance Measuring Method]

Figure 12:
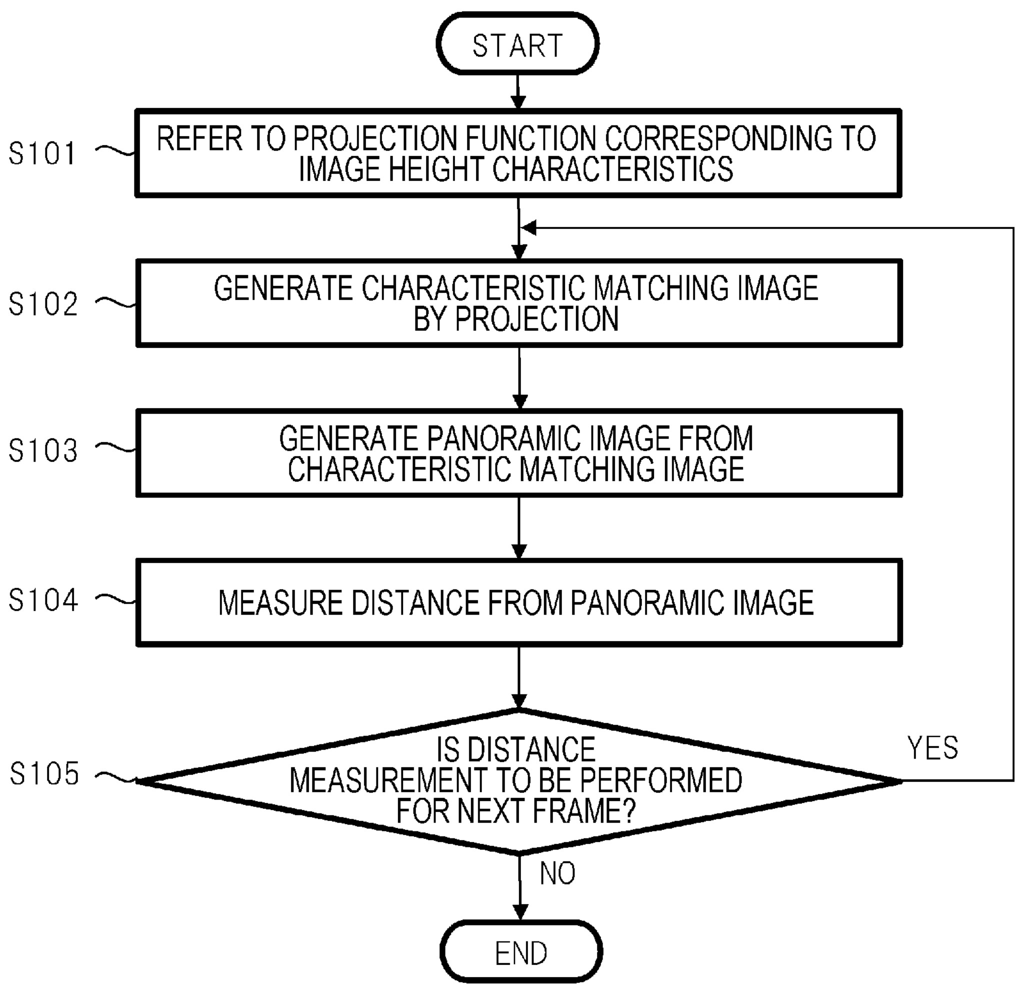
FIG. 12 illustrates a processing flow of a processing device in the first embodiment.

The distance measuring method of the first embodiment is a method including steps executed by the processor of the distance measuring apparatus 1, particularly the processing device 102, according to the functional blocks of FIG. 1 and the flow of FIG. 12. The distance measuring method according to the first embodiment includes the steps of: capturing images of a subject with the imaging device 101; generating characteristic matching images in which characteristics (in particular, numbers of effective pixels E) between two images are matched based on the captured images of the two viewpoints; generating two rectangular panoramic images by image processing such as geometric transformation based on the characteristic matching images; and measuring a distance to the subject based on the two rectangular panoramic images.

[Effects (1)]

As described above, according to the distance measuring apparatus 1 and the distance measuring method of the first embodiment, by projecting the pixels of the lower viewpoint area 203 in FIG. 8 to the corresponding pixel positions of the upper viewpoint area 202, the characteristic matching images (FIGS. 11A and 11B) in which the numbers of effective pixels E are matched in the images of the two viewpoints of the upper side and the lower side and the number of pixels that can be measured by distance from the original image is maintained is generated. The distance measuring apparatus 1 according to the first embodiment can improve the performance of distance measurement by performing the distance measurement using the characteristic matching image.

According to the first embodiment, it is possible to perform correction so as to reduce the difference in the number of effective pixels E between a plurality of captured images (or between a plurality of image areas) used for distance measurement and calculation by relatively simple processing using projection. In other words, it is possible to perform correction so as to match characteristics between a plurality of images. For example, it is possible to maintain the number of effective pixels E in the image used for distance calculation as close as possible to the number of effective pixels E of the original image, in other words, it is possible to at least reduce the difference in the number of effective pixels E between the images. As a result, performance, accuracy, and the like of distance measurement can be enhanced by performing distance calculation using the image after correction, in other words, after characteristic matching.

In the first embodiment, the main processing in the preceding stage with respect to the distance calculation by the distance measuring unit 105 in FIG. 1 is only two of the characteristic matching processing by the characteristic matching image generating unit 103, that is, the projection processing, and the geometric transformation by the image processing unit 104, that is, the processing of transformation into the panoramic image. With these relatively simple processings, it is possible to align characteristics of the two images and to perform highly accurate distance calculation without performing complex transformation, for example, complex filter processing, according to the two images of the input (the images of the upper viewpoint area 202 and the lower viewpoint area 203 in FIG. 3A).

The following is also possible as a modification of the first embodiment. In the modification, processing of generating a trapezoidal characteristic matching image as in FIG. 10 by cutting and developing from the image in FIG. 3A, projection as in FIG. 8, and conversion into a panoramic image as in FIGS. 11A and 11B are performed. However, in the case of this modification, as compared with the first embodiment, it is necessary to perform processing of converting the concentric ring-shaped image area of FIG. 3A into a trapezoidal image area as in FIG. 10 and downsampling the trapezoidal image area. Therefore, the number of processings in this modification is larger than that in the first embodiment. In the first embodiment, as compared with the modification, such processing is not performed, and projection processing is mainly sufficient. Therefore, the number of processing is small, and the accumulated error can be reduced comprehensively.

According to the projection and panoramic image generation method in the first embodiment as in FIGS. 11A and 11B, the distributions of the number of effective pixels E in the radial direction R and the peripheral direction C of the two captured images (the upper viewpoint area 202 and the lower viewpoint area 203) can be aligned, in other words, the difference in the number of effective pixels E can be reduced, as compared with the interpolation method in FIGS. 6A to 6C. Furthermore, according to the method of the first embodiment, the degree of maintenance of the number of pixels (in other words, the amount of information) from the original image can be increased as compared with the downsampling method in FIGS. 7A to 7C. That is, according to the method of the first embodiment, it is possible to satisfy both the viewpoint of aligning the numbers of effective pixels E as characteristics and the viewpoint of maintaining the number of pixels from the original image with good balance.

Second Embodiment

Figure 13:
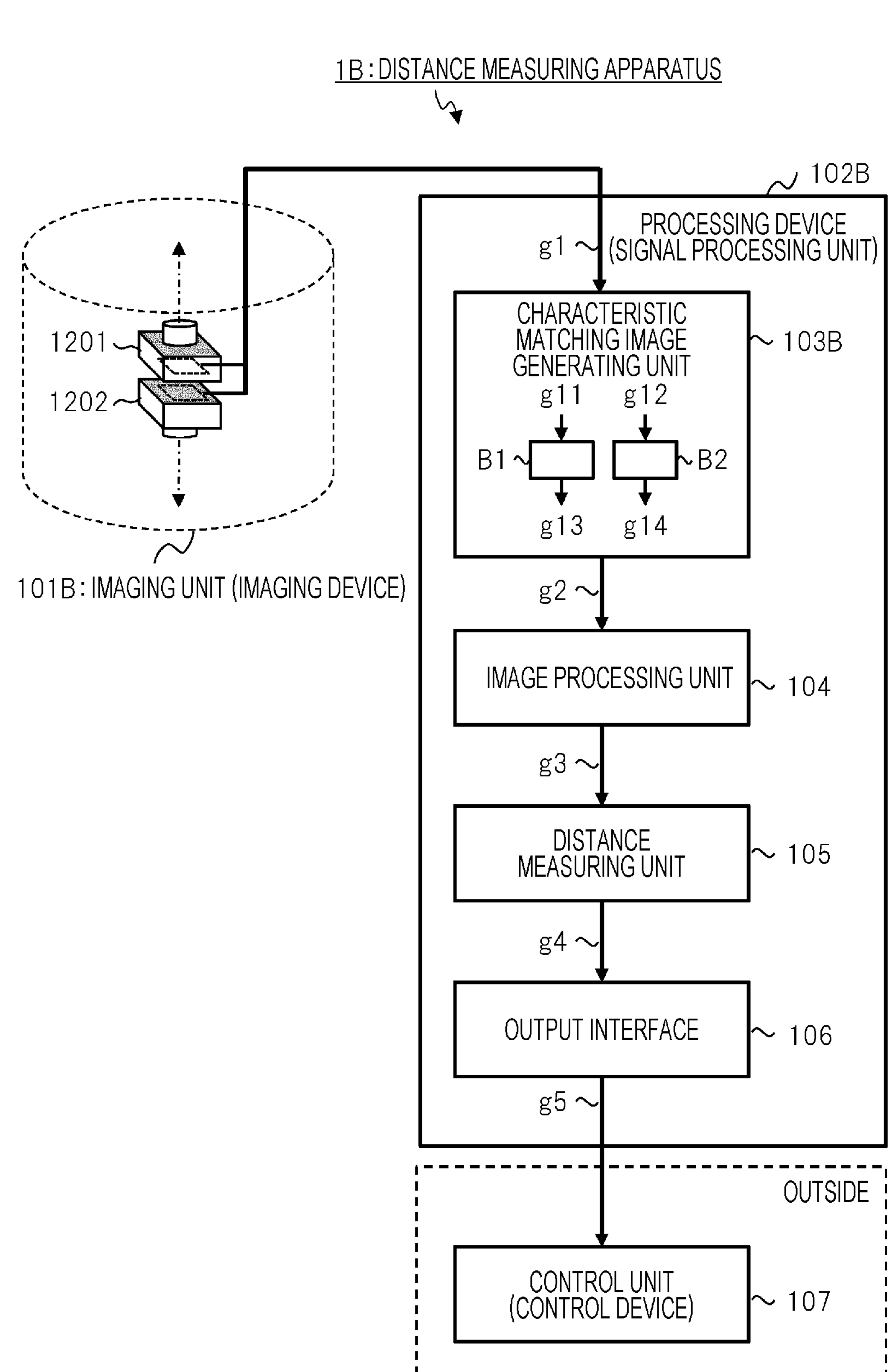
FIG. 13 illustrates a configuration of a distance measuring apparatus according to a second embodiment.

A distance measuring apparatus according to a second embodiment will be described with reference to FIG. 13 and subsequent drawings. A basic configuration of the second embodiment and the like is similar to that of the first embodiment, and hereinafter, components different from those of the first embodiment in the second embodiment and the like will be mainly described. As a configuration different from the first embodiment, in the second embodiment, two fisheye cameras (a camera 1201 and a camera 1202) are used as an imaging device 101B as illustrated in FIG. 13, and that a processing device 101B generates a characteristic matching image for each of the two captured images. The fisheye camera is a camera provided with a fisheye lens, and the fisheye lens has a wide angle larger than 180 degrees as an angle of view in the second embodiment.

In the first embodiment, the characteristic matching image unit 103 in FIG. 1 generates the characteristic matching image such that one of the input images of the two upper and lower viewpoints is matched with the characteristic of the other image. Specifically, the image 901, which is the characteristic matching image as in FIGS. 11A and 11B, is generated by the projection in FIG. 8 such that the characteristic of the image of the lower viewpoint area 302 in FIG. 4 is matched with the characteristic of the image of the upper viewpoint area 302. On the other hand, in the distance measuring apparatus 1B according to the second embodiment in FIG. 13, a characteristic matching image generating unit 103B generates a first characteristic matching image by first projection so as to match the characteristic of one image with the characteristic of the other image, and generates a second characteristic matching image by second projection such that the characteristic of the other image is matched with the characteristic of the one image, for the two images of the two upper and lower viewpoints input as the image signal g1. The image processing unit 104B generates two panoramic images from the two characteristic matching images. The distance measuring unit 105B calculates the distance based on the two panoramic images.

As illustrated in FIGS. 16A to 16D and the like to be described later, regarding the images of the two upper and lower viewpoints, the matching of the characteristics is not sufficient with only one projection on one side from one image to the other image. Therefore, the distance measuring apparatus 1B according to the second embodiment adds the projection on the other side from the other image to the one image and performs two mutual projections (the first projection and the second projection). The two projections have correspondence relationship, and the basic concept is similar to that in FIG. 8.

Note that, in the second embodiment, for example, cameras of the same type and characteristics are used as the camera 1201 and the camera 1202 which are the two fisheye cameras. Therefore, the same projection function can be applied to the two projections. As a modification, in a case where the types and characteristics of the two cameras are different, the two projections may be performed as two different projections in consideration of the characteristics of the respective cameras.

[Distance Measuring Apparatus]

FIG. 13 illustrates a schematic configuration of the distance measuring apparatus 1B according to the second embodiment. The distance measuring apparatus 1B includes the imaging device 101B which is an imaging unit and a processing device 102B. The imaging device 101B includes the camera 1201 and the camera 1202 as two fisheye cameras (in other words, imaging devices). The camera 1201 is a first camera and a first fisheye camera, and the camera 1202 is a second camera and a second fisheye camera. The camera 1201 and the camera 1202 are arranged such that their respective optical axes are substantially coaxial.

On the other hand, the distance measuring apparatus 1B according to the second embodiment in FIG. 13 performs first characteristic matching processing by the first projection on the first image (image g11) captured by the first camera 1201 in a first block B1 of the characteristic matching image generating unit 103B to obtain the first characteristic matching image (image g13) as a result. In addition, on the other hand, the distance measuring apparatus 1B performs second characteristic matching processing by the second projection on the second image (image g12) captured by the second camera 1202 in a second block B2 of the characteristic matching image generating unit 103B to obtain the second characteristic matching image (image g14) as a result.

[Imaging Device]

Figure 14:
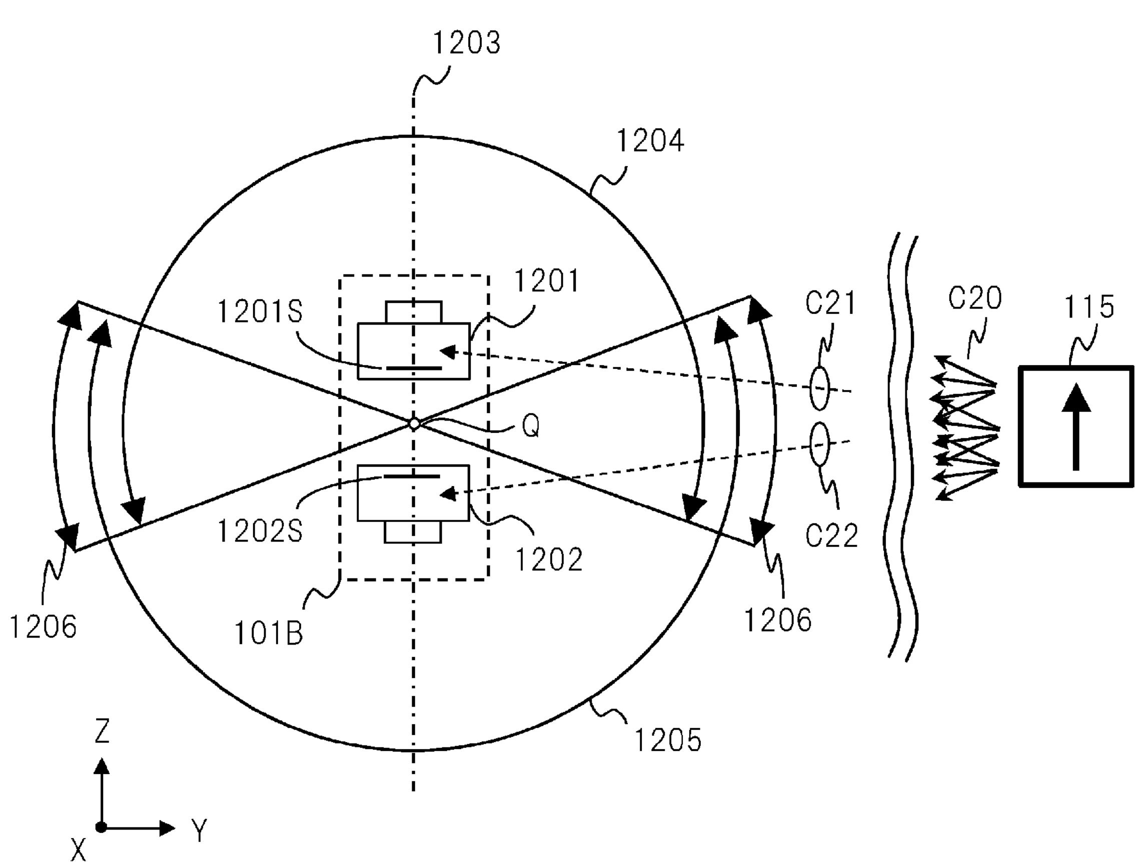
FIG. 14 illustrates a first configuration example of an imaging device in the second embodiment.

A configuration example of the imaging device 101B in the second embodiment will be described with reference to FIGS. 14 and 15. FIG. 14 is a schematic view illustrating a configuration example of the imaging device 101B. The imaging device 101B in FIG. 13 illustrates a case where the configuration as in FIG. 14 is applied. In FIG. 14, the imaging device 101B is arranged in a space of a coordinate system indicated by (X, Y, Z) illustrated. The Z direction is a vertical direction. The imaging device 101B is configured using the camera 1201 and the camera 1202 as two fisheye cameras each having a field of view of 180 degrees or more. A field of view 1204 indicated by the arc-shaped arrow indicates the field of view of the first fisheye camera 1201, and a field of view 1205 indicates the field of view of the second fisheye camera 1202. In FIG. 14, as an example, the field of view 1204 and the field of view 1205, which are the fields of view of the camera 1201 and the camera 1202, which are the fisheye cameras, are 200 degrees as the angle of view with respect to the Z axis, which is the optical axis 1203.

Since the imaging device 101B uses the two fisheye cameras, it has two image sensors. The camera 1201 includes a lens and an image sensor 1201S, and the camera 1202 includes a lens and an image sensor 1202S.

The first fisheye camera 1201 and the second fisheye camera 1202 have substantially equal optical axes 1203, and are arranged to face back on the optical axis 1203. The optical axis 1203 is arranged along the Z direction (in other words, the Z axis) which is the vertical direction in this example. On the optical axis 1203, with respect to the center Q, the viewpoint (in other words, the entrance pupil) of the camera 1201 is arranged at a position at a predetermined distance in the positive direction (upward direction in FIG. 14) of the Z axis in the positive direction, and the viewpoint of the camera 1202 is arranged at a position at the same distance in the negative direction (downward direction in FIG. 14) of the Z axis in the negative direction. Note that the camera 1201 and the camera 1202 may be arranged integrally in contact with each other.

Since the fields of view of the first fisheye camera 1201 and the second fisheye camera 1202 are 180 degrees or more, a common field of view 1206 exists as a field of view in which the field of view 1204 of the first fisheye camera 1201 and the field of view 1205 of the second fisheye camera 1202 overlap. Note that, although FIG. 14 illustrates the field of view on the Y-Z plane, the view angle is provided around the entire circumference around the Z axis, which is the optical axis 1203, including the X direction. Therefore, the common field of view 1206 also substantially exists in a ring shape not only in the right and left portions in the Y direction illustrated in the drawing but also in the entire circumference of 360 degrees around the optical axis 1203, in other words, in the circumference when viewed on the X-Y plane.

The subject 115 in the common field of view 1206, for example, the subject 115 that exists schematically in the horizontal direction (Y direction in this example) can be photographed from the first viewpoint and the second viewpoint which are two different viewpoints by the first fisheye camera 1201 and the second fisheye camera 1202, and the first image and the second image which are two images are obtained. Therefore, using these two fisheye cameras, distance measurement can be performed in the common field of view 1206 by stereo processing. Note that, since the fields of view of the first fisheye camera 1201 and the second fisheye camera 1202 are 200 degrees, in a case where the optical axes 1203 of the cameras coincide with each other, the common field of view 1206 is 20 degrees as an angle of view with respect to the illustrated Y direction (in other words, the Y axis). Therefore, in order to secure the common field of view 1206 in the entire circumference of the fisheye camera (in other words, the entire circumference of the optical axis 1203), the shift of the optical axes 1203 can be allowed up to ±20 degrees.

Figure 15:
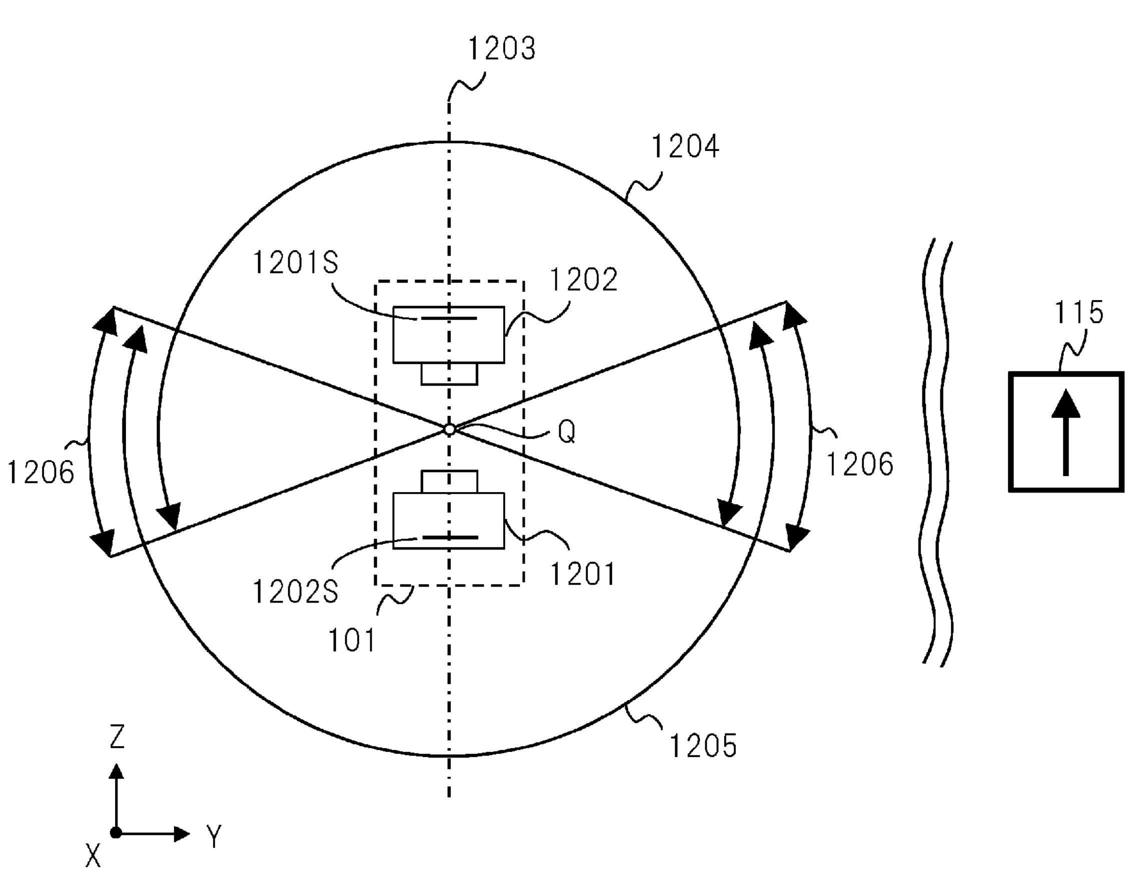
FIG. 15 illustrates a second configuration example of the imaging device in the second embodiment.

FIG. 15 is a schematic view illustrating another configuration example of the imaging device 101B in the second embodiment, similarly to FIG. 14. A configuration as in FIG. 15 may be applied as the imaging device 101B. In FIG. 15, the first fisheye camera 1201 and the second fisheye camera 1202 have substantially the same optical axis 1203, and are arranged to face each other on the optical axis 1203. On the optical axis 1203 (in this example, the Z axis), with respect to the center Q, the viewpoint of the camera 1201 is arranged in the negative direction at a position at a predetermined distance in the positive direction of the Z axis, and the viewpoint of the camera 1202 is arranged in the positive direction at a position at the same distance in the negative direction of the Z axis. The field of view 1204 of the camera 1201 and the field of view 1205 of the camera 1202 are 180 degrees or more, in particular 200 degrees, similarly to FIG. 14.

In the configuration of the opposing arrangement of FIG. 15, the common field of view 1206 exists as a field of view in which the field of view 1204 of the first fisheye camera 1201 and the field of view 1205 of the second fisheye camera 1202 overlap, similar to the configuration of the backward-facing arrangement of FIG. 14. By using these two cameras, distance measurement can be performed in the common field of view 1206 by stereo processing. Similarly to the above, when the fields of view of the camera 1201 and the camera 1202 are 200 degrees, the common field of view 1206 is 20 degrees. In addition, in order to secure the common field of view 1206 in the entire circumference of the fisheye camera, the shift of the optical axes 1203 can be allowed up to ±20 degrees.

Hereinafter, an image captured by the imaging device 101B will be described with reference to FIGS. 13 to 17. In FIG. 14, of light C20 from the subject 115, light C21 is incident on the first viewpoint of the first fisheye camera 1201 through the common field of view 1206 to form the first mapped image, and light C22 is incident on the first viewpoint of the second fisheye camera 1202 through the common field of view 1206 to form the second mapped image. The image sensor 1201S of the first fisheye camera 1201 outputs the first image obtained by capturing the first mapped image, and the image sensor 1202S of the second fisheye camera 1202 outputs the second image obtained by capturing the second mapped image. Although not illustrated, the same effect is obtained in FIG. 14.

Furthermore, the camera 1201 and the camera 1202 which are the two fisheye cameras in FIGS. 14 and 15 are arranged symmetrically with respect to a Y-Z plane (for example, a horizontal plane) including the center Q.

[Captured Image]

Figures 16A, 16B, 16C, 16D:
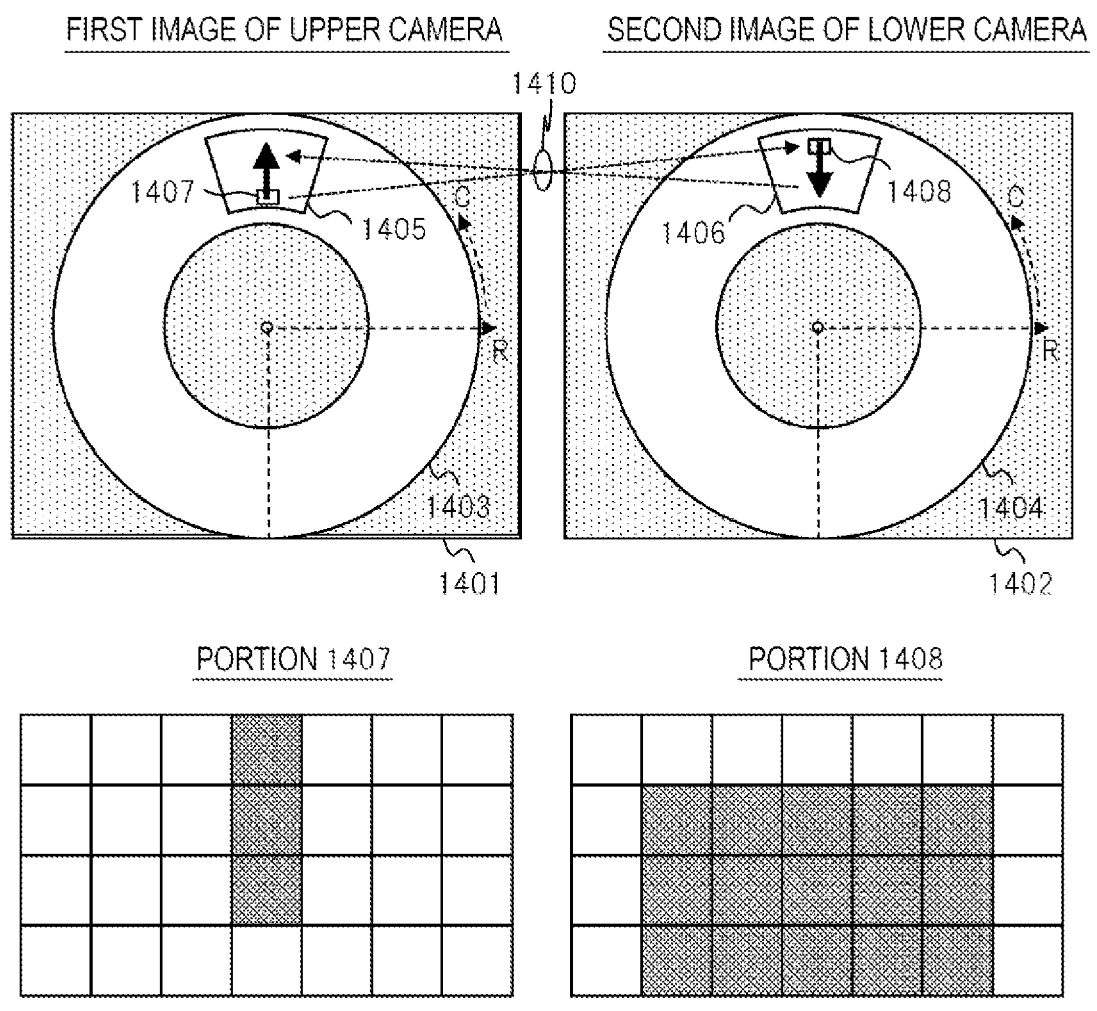
FIGS. 16A to 16D illustrate a first example of a photographed image in the second embodiment.

FIGS. 16A to 16D illustrate an example of an image in a case where the subject 115 in the common field of view 1206 is photographed by the two fisheye cameras arranged to face back in FIG. 14. FIG. 16A shows the first image (in other words, the upper image) photographed from the first viewpoint of the first fisheye camera 1201 (in other words, the upper camera). FIG. 16B shows the second image (in other words, the lower image) photographed from the second viewpoint of the second fisheye camera 1202 (in other words, the lower camera). FIG. 16A The first image has a ring-shaped image area 1403 in a rectangular image 1401. FIG. 16B The second image has a ring-shaped image area 1404 in a rectangular image 1402. These ring-shaped image areas are similar to omnidirectional images which are the images of FIGS. 3 and 8.

The photographing directions of the first fisheye camera 1201 and the second fisheye camera 1202 in FIG. 14 are opposite on the optical axis 1203. Therefore, the image 1401 captured by the first fisheye camera 1201 and the image 1402 captured by the second fisheye camera 1202 are reversed in the radial direction R. In the image area 1403, a mapped image (or an area) 1405 corresponds to the first mapped image of the subject 115, and in the image area 1404, a mapped image (or an area) 1406 corresponds to the second mapped image of the subject 115. In the first mapped image of the image 1405, an arrow image is shown in a direction from the inner periphery to the outer periphery in the radial direction R. On the other hand, in the inverted state, the second mapped image of the image 1406 shows the arrow image in a direction from the outer periphery to the inner periphery in the radial direction R. The portion 1407 and the portion 1408 are the same corresponding portions (for example, roots) of the arrow images.

Therefore, in the second embodiment, when the image area 1403 of the image 1401 and the image area 1404 of the image 1402 are developed into panoramic images, a difference in the number of effective pixels E occurs at corresponding portions (for example, the portion 1407 and the portion 1408) of the same mapped image, similarly to the first embodiment. That is, in each image, the number of pixels in the peripheral direction C changes to large or small according to the position in the radial direction R. As a result, the performance of distance measurement is deteriorated.

In the distance measuring apparatus 1B according to the second embodiment in FIG. 13, in order to prevent this deterioration in distance measurement performance, the characteristic matching image generating unit 103B generates a characteristic matching image which is an image in which the characteristics of these two images are matched. Also in the second embodiment, the characteristics to be matched are the numbers of effective pixels E when the panoramic image is formed. In a case where the first fisheye camera 1201 and the second fisheye camera 1202 use the same object or an object having similar performance, the image area 1403 in the image 1401 and the image area 1404 in the image 1402 have substantially the same number of pixels.

In this case, the enlarged views of the root portions (the portion 1407 and the portion 1408) of the same arrow image in the image 1405 in the image area 1403 and the image 1406 in the image area 1404 for the subject 115 are as illustrated in FIGS. 16C and 16D. The enlarged view of FIG. 16C shows an image of the portion 1407, and the enlarged view of FIG. 16D shows an image of the portion 1408. In FIG. 16C, the width of the root portion has one pixel in the lateral direction, and in FIG. 16D, the width of the root portion has five pixels in the lateral direction. As described above, for the same portion of the subject 115, the image 1406 in the second image of the lower camera 1202 has a larger number of pixels than the image 1405 in the first image of the upper camera 1201.

On the other hand, FIGS. 17A to 17D similarly illustrate enlarged views of distal end portions of the first mapped image and the second mapped image of the arrow images of the subject 115. An enlarged view of FIG. 17C shows an image of a location 1501 of the mapped image (or the area) 1405 of FIG. 17A, and an enlarged view of FIG. 17D shows an image of a location 1502 of the mapped image (or the area) 1406 of FIG. 17B. In these images of the enlarged views, it can be seen that the number of pixels of the arrowhead portion at the tip of the arrow image is larger in the image 1405 of the first image of the upper camera 1201 than in the image 1406 of the second image of the lower camera 1202, contrary to the root portion of FIGS. 16A to 16D.

As illustrated in FIGS. 16 and 17, in the images of the upper and lower two fisheye cameras of the imaging device 101B, the magnitude relationship of the numbers of pixels in the peripheral direction C of the corresponding portions of the images of the subject 115 in the image area 1403 and the image area 1404 changes according to the distance from the center of the area in the radial direction R. In such a case, in the characteristic matching image generating unit 103 in FIG. 1 in the first embodiment, it is not possible to generate images in which the numbers of effective pixels E are matched only by projecting pixels in one area (for example, the image area 1403) to corresponding pixel positions in the other area (for example, the image area 1404).

The above is similar not only in the case of the configuration of the backward-facing arrangement in FIG. 14 but also in the case of the configuration of the opposing arrangement in FIG. 15.

Therefore, in the second embodiment, in order to solve the above problem, the characteristic matching image generating unit 103B in FIG. 13 generates a characteristic matching image by projecting pixels in the image area 1403 of the first image of the upper camera 1201 and pixels in the image area 1404 of the second image of the lower camera 1202 to corresponding pixel positions. The characteristic to be matched is the number of effective pixels E in the peripheral direction C at each position in the radial direction R. In FIGS. 16A to 16D, a concept of the mutual projection, in other words, two projections are illustrated by an arrow 1410.

Furthermore, the configuration of the mutual projection is illustrated as a functional block configuration example of the characteristic matching image generating unit 103B in FIG. 13. For the first image and the second image which are two images of the image signal g1, the characteristic matching image generating unit 103B inputs the first image g11 to the first block B1 and inputs the second image g12 to the second block B2. The characteristic matching image generating unit 103B performs the first characteristic matching processing by the first projection on the first image g11 by the first block B1, thereby obtaining the image g13 in which the characteristic (number of effective pixels E) is matched with that of the second image g12. Similarly, the characteristic matching image generating unit 103B performs the second characteristic matching processing by the second projection on the second image g12 by the second block B2, thereby obtaining the image g14 in which the characteristic is matched with that of the first image g11. The first block B1 and the second block B2 have similar processing functions. In FIG. 13, the configuration example in which the first block B1 and the second block B2 perform the processing in parallel has been described, but the present invention is not limited thereto, and the first block B1 and the second block B2 may sequentially perform the processing in this order.

[Generation of Characteristic Matching Image]

Figure 18A:
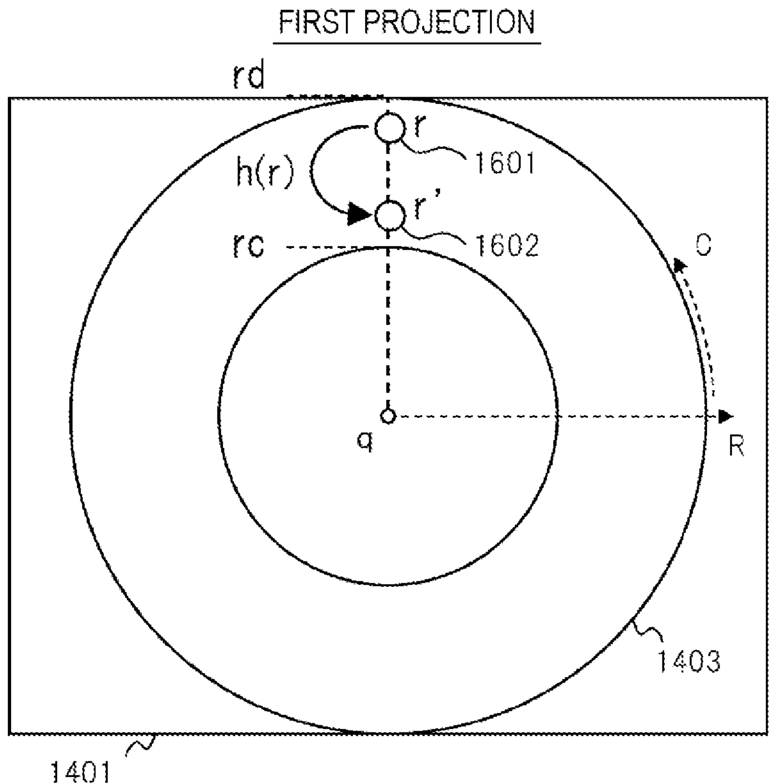
FIGS. 18A and 18B are schematic explanatory views of projection in the second embodiment.
Figure 18B:
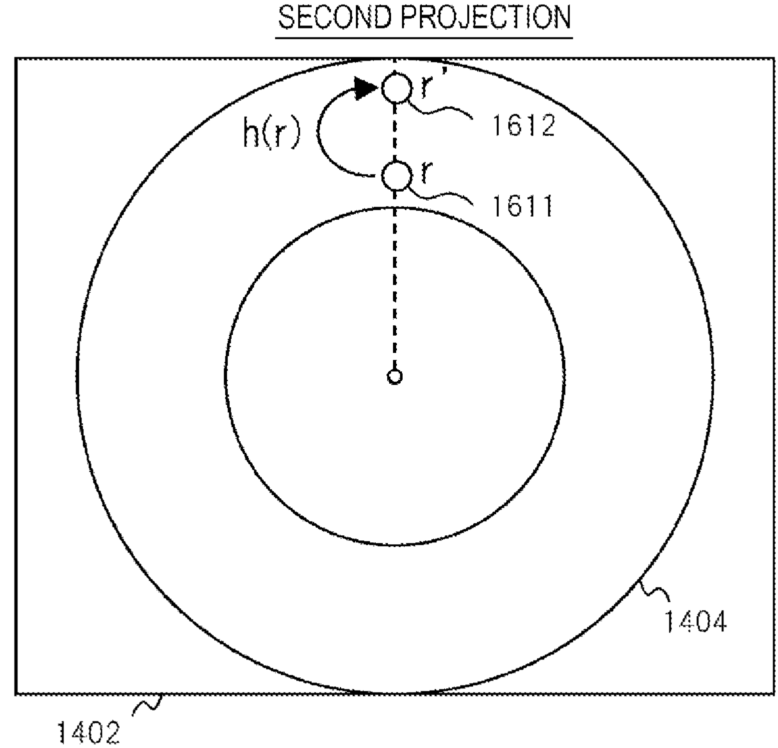

A method of generating a characteristic matching image in the second embodiment will be described with reference to FIGS. 18A and 18B. FIGS. 18A and 18B are schematic views illustrating how a pixel of interest is projected to a corresponding pixel position in the first image and the second image as in FIGS. 16A to 16D and like which are images captured by the configurations of the fisheye cameras in FIG. 14 or 15 in the second embodiment. FIG. 16A shows one first projection, and FIG. 16B shows the other second projection. For example, the first projection is projection in a direction from the first image to the second image, and the second projection is projection in a direction from the second image to the first image.

First, in FIG. 16A, the characteristic matching image generating unit 103B (particularly, the first block B1) projects a pixel of interest 1601 in the image area 1403 of the first image of the upper camera 1201 to a corresponding pixel position 1602. The pixel of interest 1601 is a pixel located at a distance r from a center q in the radial direction R. The corresponding pixel position 1602 is a position of a pixel at a corresponding portion in the image area 1404 of the second image, and is a position at a distance r' from the center q in the radial direction R. For example, the image area 1403 is a range from the distance rc to a distance rd in the radial direction R. The distance r and the distance r' are within a range from the distance rc to the distance rd.

By such first projection, the first characteristic matching image (image g13 in FIG. 13) is created. At this time, the corresponding pixel position 1602 is determined by the projection function h (r), similarly to FIG. 8 of the first embodiment. The projection function h (r) may be determined using, for example, the image height characteristic as in Equation 5 described above.

Similarly, in (B), also for the image area 1404 of the second image of the lower camera 1202, the second characteristic matching image (image g14 in FIG. 13) is created by the second projection by the same processing as in (A). The characteristic matching image generating unit 103B (particularly, the second block B2) projects a pixel of interest 1611 in the image area 1404 to a corresponding pixel position 1612. The corresponding pixel position 1612 is a position of a pixel at a corresponding portion in the image area 1403 of the first image.

In the distance measuring apparatus 1B according to the second embodiment (particularly, the processing device 102B), the characteristic matching image generating unit 103B generates a characteristic matching image by performing projection to corresponding portions between the first image and the second image by the above method. The processing device 102B uses the image signal g2 of the image g13 and the image g14 as the generated characteristic matching image to convert the generated characteristic matching image into a rectangular panoramic image in the image processing unit 104. Then, the distance measuring unit 105 calculates the distance to the subject based on the two panoramic images.

[Effects (2)]

As described above, according to the second embodiment, it is possible to generate the characteristic matching images in which the numbers of effective pixels E are matched even between images having different magnitude relationships of the number of pixels according to the positions in the radial direction R in the images, for two images of two viewpoints obtained by the imaging device 101B in FIG. 14 and the like. Then, according to the second embodiment, since the distance measurement is performed using these images, the performance of the distance measurement can be improved.

Third Embodiment

A distance measuring apparatus according to a third embodiment will be described with reference to FIG. 19 and subsequent drawings. As a configuration different from the first embodiment, in a distance measuring apparatus 1C according to the third embodiment in FIG. 19, two cameras are arranged in parallel in the same direction as a stereo camera in the imaging device 101C, and an image to be captured is not an entire surrounding image.

In addition, in the third embodiment, similarly to the first embodiment, the characteristic matching image generation by projection is performed in the direction from the first image, which is one image, to the second image, which is the other image, obtained from the imaging unit. This projection is basically similar to the projection in the first embodiment.

[Distance Measuring Apparatus]

Figure 19:
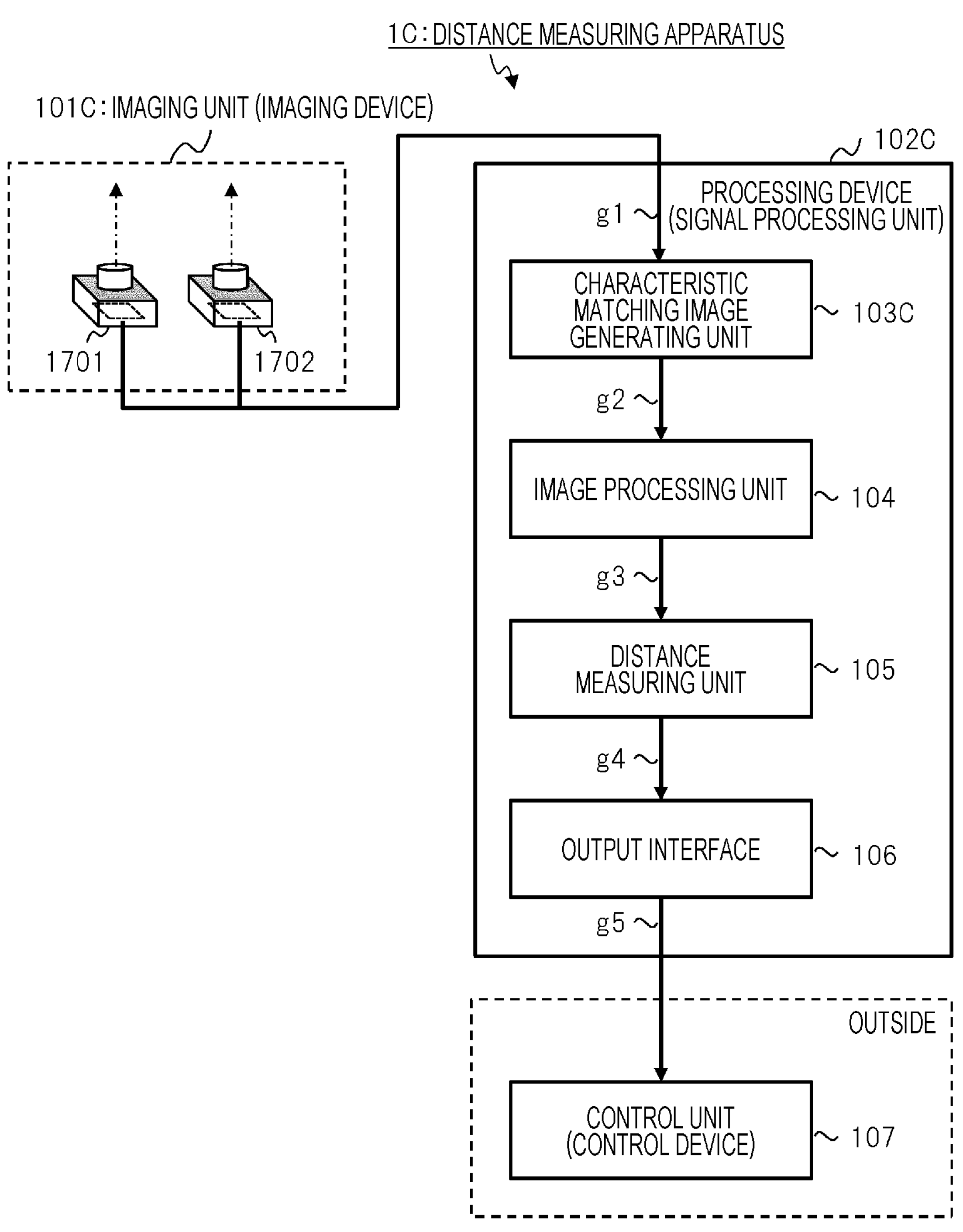
FIG. 19 illustrates a configuration of a distance measuring apparatus according to a third embodiment.

FIG. 19 illustrates a configuration of the distance measuring apparatus 1C according to the third embodiment. The distance measuring apparatus 1C includes the imaging device 101C and a processing device 102C. The configuration of the distance measuring apparatus 1C is similar to that of the first embodiment (FIG. 1) or the second embodiment (FIG. 13) except for the imaging device 101C. Furthermore, in the third embodiment, since the original images obtained from the two cameras are rectangular images, panoramic conversion (in other words, generation of a panoramic image) in the image processing unit 104 is unnecessary.

[Imaging Device]

Figure 20:
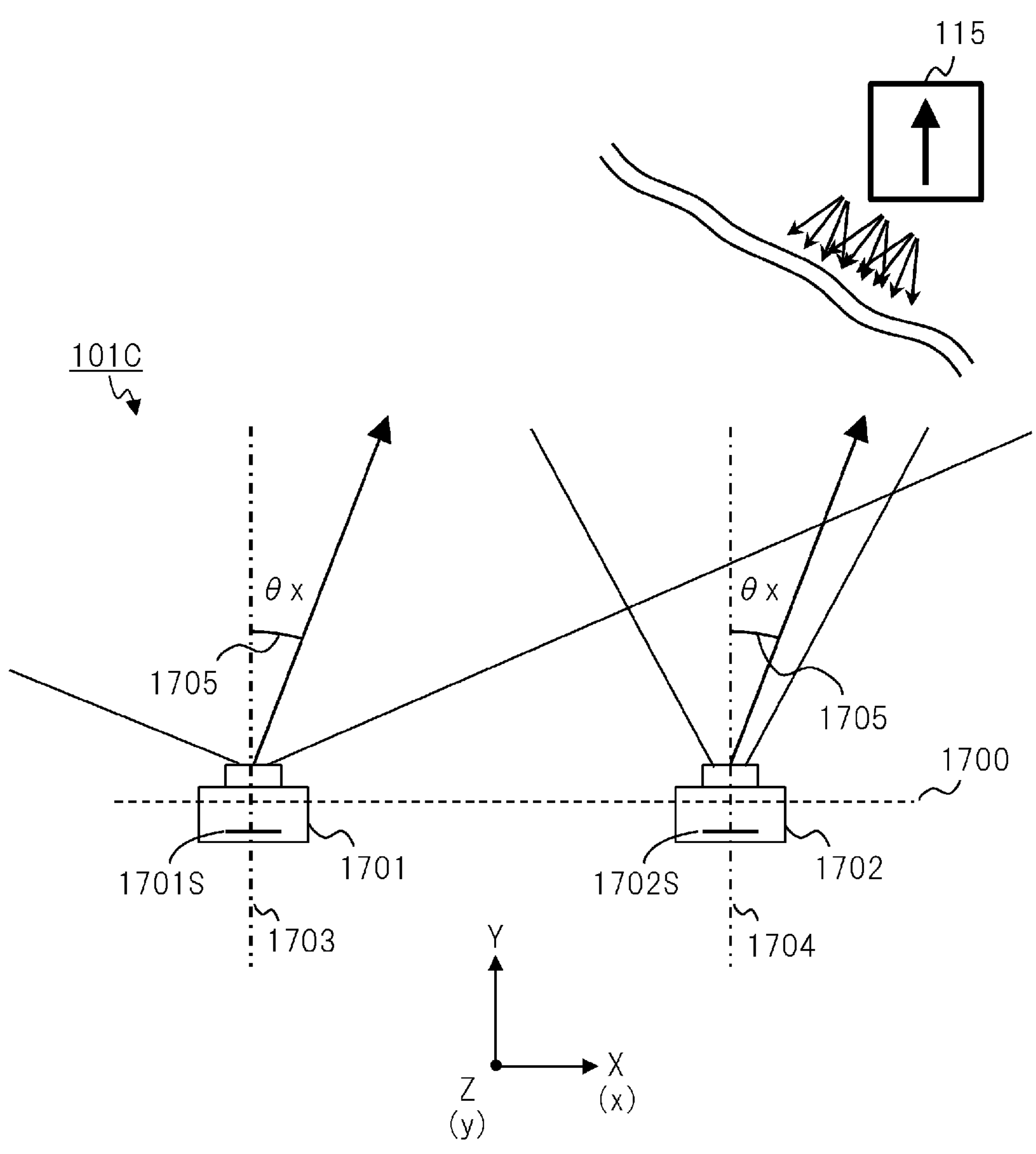
FIG. 20 illustrates a configuration example of an imaging device in the third embodiment.

FIG. 20 is a schematic explanatory view illustrating a configuration example of the imaging device 101C according to the third embodiment. The imaging device 101C which is an imaging unit is configured using a camera 1701 and a camera 1702 as two cameras constituting a stereo camera. In FIG. 20, the imaging device 101C is arranged in a space of the illustrated coordinate system of (X, Y, Z). The Z direction is a vertical direction. The camera 1701 and the camera 1702 are arranged in parallel at predetermined positions at a predetermined interval on a straight line 1700 in the X direction. The camera 1701 is a first camera having a first viewpoint, and the camera 1702 is a second camera having a second viewpoint.

Since the imaging device 101C uses two cameras (the camera 1701 and the camera 1702), the imaging device includes two image sensors. The camera 1701 includes a lens and an image sensor 1701S, and the camera 1702 includes a lens and an image sensor 1702S.

An optical axis 1703 of the first camera 1701 and an optical axis 1704 of the second camera 1702 are substantially parallel. The optical axis 1703 of the camera 1701 and the optical axis 1704 of the camera 1702 are arranged in the same direction, in the Y direction which is one horizontal direction in this example.

The field of view of the first camera 1701 and the field of view of the second camera 1702 exist as fields of view according to the angle of view of each camera. The field of view of the first camera 1701 and the field of view of the second camera 1702 may be different. In this example, the second camera 1702 has a smaller field of view than the first camera 1701. In other words, in the present example, the first camera 1701 has a wide field of view with a wide angle, and the second camera 1702 has a narrower field of view with a narrow angle than the first camera 1701. However, the number of pixels of the photographed image of the first camera 1701 is substantially the same as the number of pixels of the photographed image of the second camera 1702. The first image of the first camera 1701 and the second image of the second camera 1702 have substantially the same image size and different resolutions (in other words, pixel densities).

Due to the arrangement of the two cameras as in FIG. 20, there is a common field of view in which the fields of view of the first camera 1701 and the second camera 1702 overlap. By using these two cameras, distance measurement can be performed in the common field of view by stereo processing. In this example, the second camera 1702 has a smaller field of view than the first camera 1701. Therefore, in the first image captured by the first camera 1701 and the second image captured by the second camera 1702, the number of pixels of a portion where the subject 115 is shown is smaller in the first image captured by the first camera 1701 than in the second image.

Therefore, as a comparative example with respect to the third embodiment, a difference in the number of effective pixels E occurs in an image after the first image captured by the first camera 1701 and the second image captured by the second camera 1702 are processed as they are by the image processing unit, that is, in a panoramic image for distance measurement. As a result, the performance of distance measurement is deteriorated.

Therefore, in order to solve the above problem, the distance measuring apparatus 1C according to the third embodiment generates a characteristic matching image by performing projection from pixels in the area of the first image of the first camera 1701 to corresponding pixel positions in the area of the second image of the second camera 1702 in the characteristic matching image generating unit 103C of the processing device 102C in FIG. 19.

[Generation of Characteristic Matching Image and Projection]

Hereinafter, a method of generating a characteristic matching image in the third embodiment will be described with reference to FIGS. 20 and 21. In FIG. 20, with the optical axis 1703 of the first camera 1701 as a reference, the magnitude of a signed angle 1705 in the horizontal direction (X direction in FIG. 20) is θx, and the magnitude of the signed angle in the vertical direction (Z direction in FIG. 20) is θy. Symbols x and y correspond to the coordinate system (x, y) in the camera image of FIG. 21.

Figure 21:
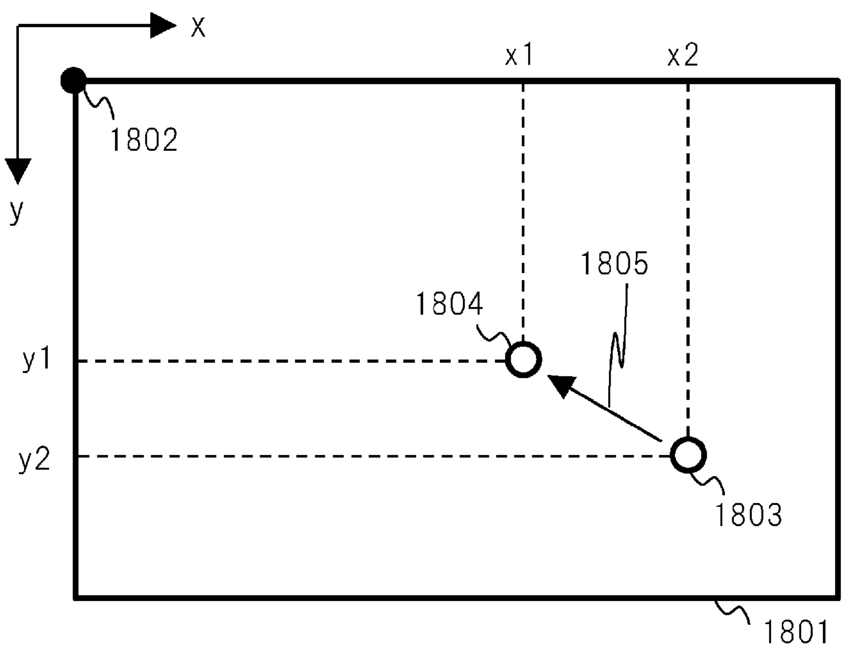
FIG. 21 is a schematic explanatory view of projection in the third embodiment.

FIG. 21 is a schematic explanatory view illustrating a method of specifying a pixel position and pixel projection in the second image acquired by the second camera 1702 in FIG. 20. FIG. 21 illustrates a rectangular image 1801 which is the second image acquired by the second camera 1702. In the image 1801, an upper left pixel 1802 is set as the origin. An x axis is set rightward in the horizontal direction and a y axis is set downward in the vertical direction from the origin pixel 1802. A pixel (in other words, position coordinates) in the image 1801 is designated using the value of (x, y). The same applies to the pixel designation method for the first image acquired by the first camera 1701 in FIG. 21.

Note that, in FIG. 21, although the first image captured by the first camera 1701 is not illustrated, a corresponding pixel position 1804 in the first image is illustrated to be superimposed on the image 1801 which is the second image. The first image is a rectangular image having the same size as the second image, but has a resolution different from that of the second image in response to a difference in the field of view as in FIG. 20.

Here, a method of determining a corresponding pixel position when a pixel (in other words, a pixel of interest) in the image 1801, which is the second image captured by the second camera 1702, is projected to a corresponding pixel position in the first image captured by the first camera 1701, using the image height characteristic will be described. In FIG. 21, an arrow 1805 from a pixel of interest 1803 of the first image to the corresponding pixel position 1804 of the second image corresponds to the concept of projection. The concept of this projection is similar to that of the first embodiment or the second embodiment, but specifically, includes respective projections in two directions of an x direction (in other words, the x axis and the in-image horizontal direction) and a y direction (in other words, the y axis and the in-image vertical direction) as two directions in the image.

Note that, as a modification, even in a case where the first image captured by the first camera 1701 and the second image captured by the second camera 1702 have different image sizes and have the same resolution, the mechanism of the third embodiment can be similarly applied.

In FIG. 21, the x coordinate of the pixel of interest 1803 is x2, the y coordinate is y2, the x coordinate of the corresponding pixel position 1804 is x1, and the y coordinate is y1. In addition, the image height characteristic of the first camera 1701 in the horizontal direction (x direction) is x1=f1 (θx), and the image height characteristic in the vertical direction (y direction) is y1=g1 (θy). Similarly, the image height characteristic of the second camera 1702 in the horizontal direction (x direction) is x2=f2 (θx), and the image height characteristic in the vertical direction (y direction) is y2=g2 (θy).

By using these image height characteristics of the cameras, the x coordinate x1 and the y coordinate y1 of the corresponding pixel position 1804 can be determined. First, the x coordinate x1 of the corresponding pixel position 1804 can be calculated by Equation 8 described below using x1=f1 (θx) and x2=f2 (θx).

[Equation 8]

$$x2 = f2(\theta x) = f2\left(f1^{-1}(x1)\right) \quad \text{Equation 8}$$

Similarly, the y coordinate y1 of the corresponding pixel position 1804 can be calculated by Equation 9 described below using y1=g1 (θy) and y2=g2 (θy).

[Equation 9]

$$y2 = g2(\theta x) = g2\left(g1^{-1}(y1)\right) \quad \text{Equation 9}$$

As described above, the corresponding pixel position can be determined using the image height characteristics of the first camera 1701 and the second camera 1702. By projection using these image height characteristics, the number of effective pixels E as a characteristic of the second image captured by the second camera 1702 can be matched with the number of effective pixels E as a characteristic of the first image captured by the first camera 1701. Note that the pixel of interest 1803 and the corresponding pixel position 1804 in the above example correspond to the pixel at the distance r and the corresponding pixel position at the distance r' in FIG. 8 in the correspondence relationship with the first embodiment.

As described above, in the third embodiment, characteristic matching processing unit 103C in FIG. 19 performs the characteristic matching processing so as to project the pixels of the second image of the second camera 1702 to the corresponding pixel positions of the first image of the first camera 1701. As a result, images in which the numbers of effective pixels E are matched can be generated. The characteristic matching processing unit 103C in FIG. 19 outputs the first image and the second image after the characteristic matching. The image processing unit 104 performs image processing for distance measurement on these two images. Then, the distance measuring unit 105 calculates the distance based on the two rectangular images after the image processing.

[Effects (3)]

As described above, according to the third embodiment, in the case of the configuration of the stereo camera as in FIG. 20, the characteristics of the two images can be matched only by simple processing mainly by projection, and the accuracy of distance measurement can be improved.

Fourth Embodiment

A distance measuring apparatus according to a fourth embodiment will be described with reference to FIG. 22. As a configuration different from the first embodiment, in a distance measuring apparatus 1D according to the fourth embodiment in FIG. 22, processing by a filtering unit 108 is added between the characteristic matching image generating unit 103 and the image processing unit 104 in a processing device 102D.

[Distance Measuring Apparatus]

Figure 22:
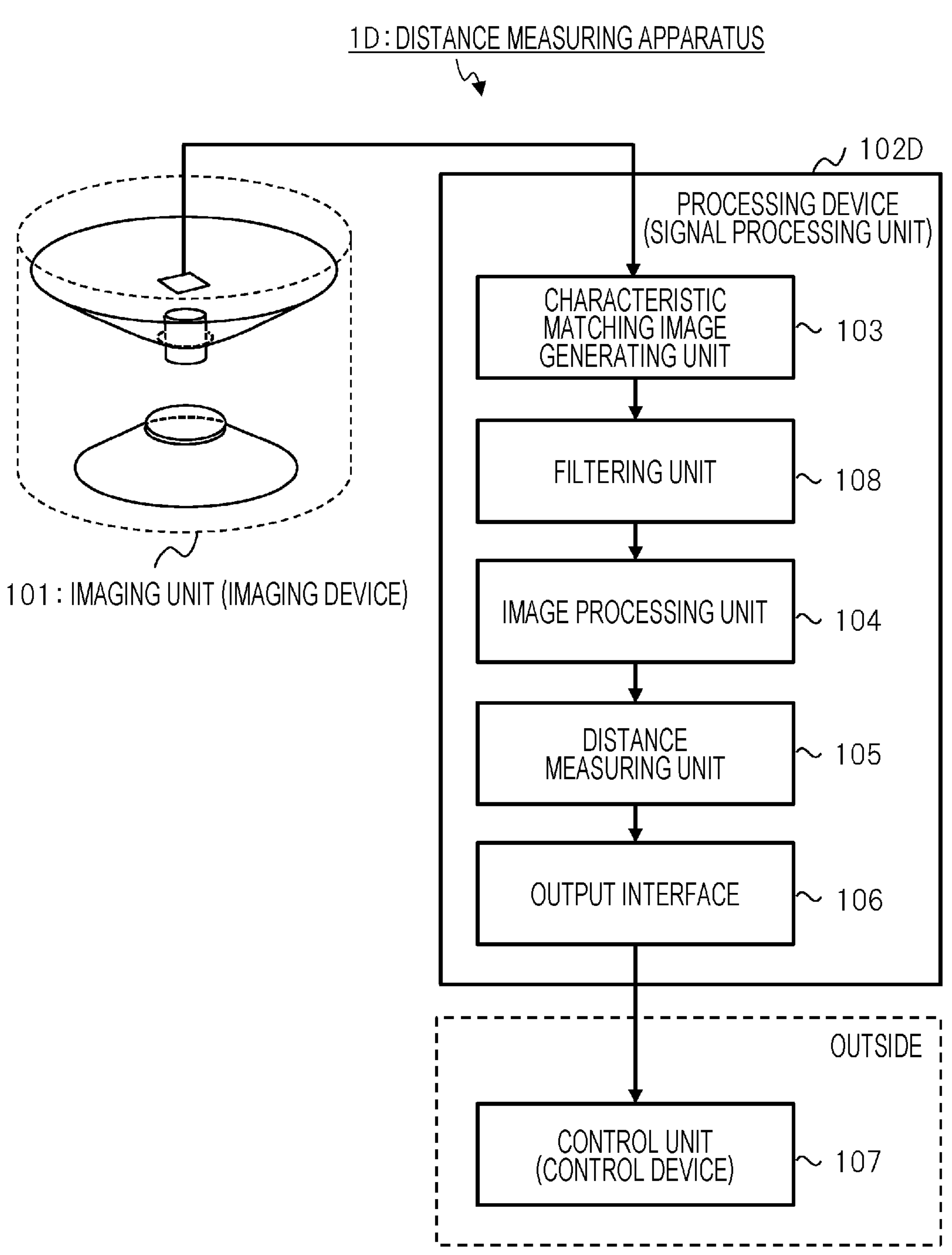
FIG. 22 illustrates a configuration of a distance measuring apparatus according to a fourth embodiment.

FIG. 22 illustrates a configuration of the distance measuring apparatus 1D according to the fourth embodiment. The distance measuring apparatus 1D includes the imaging device 101 and the processing device 102D. As an example, the distance measuring apparatus 1D includes the imaging device 101 identical to the imaging device 101 in the first embodiment. In the processing device 102D, the filtering unit 108 is provided between the characteristic matching image generating unit 103 and the image processing unit 104 in addition to the components in the first embodiment.

The filtering unit 108 is a block that performs uniform filtering on the characteristic matching image generated by the characteristic matching image generating unit 103. As a result, non-uniform filtering can be realized for the original images. The original images are two images of the image signal g1 from the imaging device 101.

Here, uniform filtering refers to filtering in which a low-pass filter (LPF) such as a general Gaussian filter is used, and the cutoff frequency of the LPF is always constant regardless of the position in the image. On the other hand, non-uniform filtering refers to filtering with filters having different cutoff frequencies depending on the position in the image. This non-uniform filtering is effective in a case where it is desired to perform filtering of a cutoff frequency corresponding to a distance on an image in which the number of pixels (particularly, the number of pixels in the peripheral direction C) changes depending on the distance from a certain point in the image in the radial direction R, as in the image 201 described above with reference to FIG. 2. Hereinafter, this filtering will be described in detail.

In the example of the fourth embodiment, it is assumed that the characteristic matching image by projection as in FIG. 8 created in the first embodiment is used as the image to which the filter is applied (that is, the image generated by the characteristic matching image generating unit 103). Furthermore, in the example of the fourth embodiment, an LPF such as a general Gaussian filter is used as a uniform filter, and the reciprocal of the cutoff frequency of the LPF is n pixels.

Note that n of the n pixels is the number of pixels of vertical and horizontal sizes in a range in which the effect of the filter is exerted. FIG. 23 illustrates an example of a Gaussian filter. In the example of the kernel of the Gaussian filter, n indicates a 5×5 area as a range in which the effect of the filter is exerted. In the case of the kernel of the Gaussian filter in FIG. 23, the range in which the effect of the filter is exerted is an area in which the weighting value is appropriately set, and is an area obtained by excluding an invalid area in which the value is set to 0 or 1, for example.

In the lower viewpoint area 203 in FIG. 8, a pixel at a position at the distance r in the radial direction R from the center 703 of the area is projected to a corresponding pixel position where the distance r' from the center 703 is r'=h (r) by the projection function of Equation 5 described above. By this projection, an effect equivalent to the effect that the filter having the reciprocal of the cutoff frequency of r/h (r) acts is generated in the pixel at the distance r from the center 703 in the image 201. This projection is similarly performed by the characteristic matching image generating unit 103 in FIG. 22.

Furthermore, the filtering unit 108 causes a uniform filter in which the reciprocal of the cutoff frequency is n pixels to act on the area after the projection, that is, the characteristic matching image. As a result, the filter of the reciprocal of the cutoff frequency expressed by Equation 10 described below effectively acts on the lower viewpoint area 203 of the image 201.

[Equation 10]

$$\frac{r}{h(r)} \times n \qquad \text{Equation 10}$$

Equation 10 means that the cutoff frequency changes depending on the distance r from the center 703. As a result, a non-uniform filter in which the cutoff frequency changes depending on the distance from the center where the pixel is located is realized for the pixel in the lower viewpoint area 203 of the image 201.

With the filtering described above, for example, in a case where the amount of blurring changes according to the distance from the center of the image due to distortion of the lens of the camera of the imaging device 101, it is possible to correct the blurring to be uniform in the entire image by appropriately selecting the cutoff frequency.

[Effects (4)]

As described above, according to the fourth embodiment, by generating the characteristic matching image and performing uniform filtering on the characteristic matching image, non-uniform filtering on the original image can be realized. According to the fourth embodiment, it is possible to perform correction so as to reduce the difference in the number of effective pixels E between a plurality of captured images used for distance measurement by relatively simple processing using projection and filtering.

Although the embodiments of the present disclosure have been specifically described above, the present disclosure is not limited to the above-described embodiments, and various modifications can be made without departing from the scope of the present disclosure. In each embodiment, components can be added, deleted, replaced, and the like except for essential components. When not particularly limited, each component may be singular or plural. A combination of the embodiments is also possible.

REFERENCE SIGNS LIST

1 distance measuring apparatus
101 imaging device
102 processing device
103 characteristic matching image generating unit
104 image processing unit
105 distance measuring unit
106 output interface
107 control unit
201 image
202 upper viewpoint area
203 lower viewpoint area
701 pixel of interest
702 corresponding pixel position
703 center
800 projection

The invention claimed is:

1. A distance measuring apparatus comprising:

an imaging device that captures images in which a subject is captured; and a processing device configured to acquire the images from the imaging device and process the images, input two or more images including a first image obtained by photographing the subject from a first viewpoint and a second image obtained by photographing the subject from a second viewpoint different from the first viewpoint among the images, and generate two or more images as characteristic matching images in which a characteristic of the first image and a characteristic of the second image are matched, calculate a distance to the subject by calculating a parallax based on the two or more images as the characteristic matching images, and generate the characteristic matching images by projecting a pixel of interest in at least one of the first image and the second image to a corresponding pixel position in the other image, wherein the processing device is configured to perform image processing of converting a one-point perspective coordinate system of the characteristic matching images into a cylindrical coordinate system for distance calculation, and wherein the processing device applies a filter having a constant cutoff frequency to the characteristic matching images.

2. The distance measuring apparatus according to claim 1, wherein the processing device generates the characteristic matching images by projecting a pixel of interest in the first image to a corresponding pixel position in the second image.

3. The distance measuring apparatus according to claim 1, wherein the processing device generates a first characteristic matching image by projecting a pixel of interest in the first image to a corresponding pixel position in the second image;

generates a second characteristic matching image by projecting a pixel of interest in the second image to a corresponding pixel position in the first image; and sets the first characteristic matching image and the second characteristic matching image as the characteristic matching images.

4. The distance measuring apparatus according to claim 1, wherein the characteristic is the number of effective pixels as the number of pixels that can be used for distance measurement relating to a pixel number distribution of a same mapped image in the image.

5. The distance measuring apparatus according to claim 1, wherein the processing device determines the corresponding pixel position of the pixel of interest in the projection based on an image height characteristic of an optical system that captures the first image of the imaging device and an image height characteristic of an optical system that captures the second image.

6. The distance measuring apparatus according to claim 1, wherein the imaging device includes a single image sensor and an imaging optical system that images light from the subject on the image sensor, and the imaging optical system includes a first optical system that projects a first mapped image corresponding to the first image to the image sensor, and a second optical system that projects a second mapped image corresponding to the second image to the image sensor.

7. The distance measuring apparatus according to claim 6, wherein the imaging optical system includes a plurality of hyperboloid mirrors as elements constituting the first optical system and the second optical system.

8. The distance measuring apparatus according to claim 6, wherein the first image and the second image in the image are arranged in a concentric ring shape.

9. The distance measuring apparatus according to claim 1, wherein the imaging device includes:

a first lens and a first image sensor as a first optical system that captures the first image; and a second lens and a second image sensor as a second optical system that captures the second image, and the first optical system and the second optical system are arranged to face back or opposite to each other on a same axis.

10. The distance measuring apparatus according to claim 1, wherein the imaging device includes:

a first lens and a first image sensor as a first optical system that captures the first image; and a second lens and a second image sensor as a second optical system that captures the second image, and the first optical system and the second optical system have optical axes arranged in parallel in a same direction.

11. The distance measuring apparatus according to claim 10, wherein the processing device performs image processing of converting a coordinate system of the characteristic matching images into a coordinate system for distance calculation, and the processing device converts the first image and the second image each having a concentric ring shape in the characteristic matching images into rectangular panoramic images, inverts one of the obtained first panoramic image and second panoramic image so as to match directions of mapped images of the subject, and sets the first panoramic image and the second panoramic image as two images for distance calculation.

12. A distance measuring method in a distance measuring apparatus, the distance measuring apparatus including: an imaging device that captures images in which a subject is captured; and a processing device that acquires the image from the imaging device and processes the image, the distance measuring method comprising:

a characteristic matching image generation step of, by the processing device, inputting two or more images including a first image obtained by photographing the subject from a first viewpoint and a second image obtained by photographing the subject from a second viewpoint different from the first viewpoint among the images, and generating two or more images as characteristic matching images in which a characteristic of the first image and a characteristic of the second image are matched; and a distance measurement step of, by the processing device, calculating a distance to the subject by calculating a parallax based on the two or more images as the characteristic matching images, and wherein the characteristic matching image generation step generates the characteristic matching images by projecting a pixel of interest in at least one of the first image and the second image to a corresponding pixel position in the other image, wherein the processing device is configured to perform image processing of converting a one-point perspective coordinate system of the characteristic matching images into a cylindrical coordinate system for distance calculation, and wherein the processing device applies a filter having a constant cutoff frequency to the characteristic matching images.

13. A distance measuring apparatus comprising:

an imaging device that captures images in which a subject is captured; and a processing device configured to acquire the images from the imaging device and process the images, input two or more images including a first image obtained by photographing the subject from a first viewpoint and a second image obtained by photographing the subject from a second viewpoint different from the first viewpoint among the images, and generate two or more images as characteristic matching images in which a characteristic of the first image and a characteristic of the second image are matched, calculate a distance to the subject by calculating a parallax based on the two or more images as the characteristic matching images, and generate the characteristic matching images by projecting a pixel of interest in at least one of the first image and the second image to a corresponding pixel position in the other image, wherein the processing device is configured to perform image processing of converting a one-point perspective coordinate system of the characteristic matching images into a cylindrical coordinate system for distance calculation, and wherein the imaging device includes:

a first lens and a first image sensor as a first optical system that captures the first image; and a second lens and a second image sensor as a second optical system that captures the second image, and the first optical system and the second optical system are arranged to face back or opposite to each other on a same axis.

* * * * *